United States Patent [19]

Kanno et al.

[11] Patent Number: 5,241,538
[45] Date of Patent: Aug. 31, 1993

[54] TRANSMISSION APPARATUS

[75] Inventors: Ippei Kanno, Hirakata; Seiji Sakashita, Yawata, both of Japan

[73] Assignee: Matsushita Electric Industrial Co., Ltd., Osaka, Japan

[21] Appl. No.: 637,649

[22] Filed: Jan. 4, 1991

[30] Foreign Application Priority Data

Jan. 18, 1990 [JP] Japan .................................. 2-8644
Jan. 18, 1990 [JP] Japan .................................. 2-8645

[51] Int. Cl.$^5$ ...................... H04N 1/06; H04N 7/08; H04J 1/00
[52] U.S. Cl. .................... 370/69.1; 358/142; 358/12; 358/328
[58] Field of Search ............. 370/69.1, 77, 6, 118, 370/26, 123; 358/12, 141, 147, 14, 15, 328, 142, 144, 146, 143, 148, 139; 455/42, 45, 102, 112, 22, 43; 360/33, 30, 10.2; 375/10, 36, 58, 99, 102, 103, 23

[56] References Cited

U.S. PATENT DOCUMENTS

| | | | |
|---|---|---|---|
| 4,199,779 | 4/1980 | Nagaika et al. | 358/328 |
| 4,246,608 | 1/1981 | Baker | 370/6 |
| 4,379,947 | 4/1983 | Warner | 370/69.1 |
| 4,811,119 | 3/1989 | Kobayashi et al. | 358/328 |
| 4,876,614 | 10/1989 | Kaaden et al. | 360/10.2 |
| 4,882,614 | 11/1989 | Kageyama et al. | 358/12 |
| 4,985,769 | 1/1991 | Yasumota et al. | 358/142 |
| 5,061,999 | 10/1991 | Sakashita et al. | 358/12 |

*Primary Examiner*—Douglas W. Olms
*Assistant Examiner*—Dang Ton
*Attorney, Agent, or Firm*—Wenderoth, Lind & Ponack

[57] ABSTRACT

Satellite transmission sometimes uses a method of modulating by a sub signal a subcarrier with a frequency set higher than that of a main signal and subjecting the main carrier to frequency modulation by the resulting baseband signal. This method is, however, accompanied by a problem of the occurrence of crosstalk from the main signal to the sub signal. This is attributable to the limited band width of the main carrier on the transmission line, allowing a correction signal equal in magnitude but negative in phase to the crosstalk to be easily prepared on the basis of the transmission line amplitude and group-delay frequency responses and the main signal. The crosstalk may be improved if this correction signal is prepared from the main signal on the transmitting side and added to the sub signal to be transmitted or if the correction signal is prepared from the demodulated main signal on the receiving side and added to the demodulated sub signal.

28 Claims, 19 Drawing Sheets

TRANSMISSION APPARATUS

BACKGROUND OF THE INVENTION

1. Field of the Invention

This invention relates to a transmission apparatus which can be used for satellite broadcasting and communication in sending and receiving multiplex signals.

2. Description of the Prior Art

A method of multiplex transmission has been proposed to send sub video signals, such as additional information for higher definition and an increased aspect ratio, without interfering with conventional satellite broadcasting receivers. This transmission method modulates the frequency of a main carrier using a baseband signal obtained by modulating by means of a sub video signal the picture subcarrier with a frequency set higher than those of the main video signal and audio subcarrier. However, this method, which has already been described in U.S. patent application Ser. No. 07/268,966 field on Nov. 9, 1988, now U.S. Pat. No. 5,061,999, is accompanied by a problem of an occurrence of crosstalk from the main video signal to the sub video signal.

The manner in which such crosstalk occurs is described below.

The main carrier transmission line amplitude and group-delay frequency responses are represented by the sum of nth-order polynomials with the frequencies as its variable whose origin is the central frequency of the transmission line. In such cases, the coefficients of the amplitude response's 3rd-order and group-delay response's 1st-order terms are associated with the 2nd-order intermodulation generated in the baseband signal (modulation signal) transmitted. This mechanism has been disclosed in FM Musen Kogaku pp 546–552, Sugawara et al., Nikkan Kogyo Shinbunsha.

This intermodulation becomes particularly higher when the bandwidth of a transmission line is smaller than the occupied bandwidth of a main carrier specified by the Carson's rule. Here, the BW, or the occupied bandwidth of a frequency modulation signal specified by the Carson's rule, is given by the following equation:

$$BW = f + 2\,fm \quad (1)$$

where $\Delta f$ represents the maximum frequency deviation of the main carrier and fm represents the highest frequency of the modulation signal. At present, satellite broadcasting uses the transmission line bandwidth of 27 MHz and $\Delta f$ of 17 MHz p-p, with fm of 10 MHz for the multiplex signal. This calculates the BW to be 37 MHz, raising a problem of the 2nd-order intermodulation taking place in a modulation signal.

Meanwhile, the main carrier transmission line amplitude and group-delay responses depend largely on the band-pass filter (BPF) characteristics of a transmitter, a receiver, and a satellite transponder. If the main carrier is in the center of the BPF and the amplitude and group-delay responses of the BPF are axis-symmetric, no amplitude response's 3rd-order and group-delay response's 1st-order terms develop. This means there is no occurrence of 2nd-order intermodulation in the modulation signal. However, if the main carrier deviates from the center due to frequency modulation, the amplitude response's 3rd-order and groupdelay response's 1st-order terms develop, thereby generating the 2nd-order intermodulation in the modulation signal.

In the frequency modulation, the instantaneous voltage of a modulation signal determines the instantaneous frequency of the carrier. Here, the modulation signal is a multiplex signal where an audio and a picture subcarrier are superimposed on the main video signal and, therefore, the main video signal determines the bias point of the main carrier on the transmission line. The averaging automatic frequency control (AFC) method used by the existing satellite broadcasting for the transmission of a main carrier sets the frequency f0 corresponding to the DC level v0 (averaging picture level, APL) of a modulation signal to be equal to the central frequency of the BPF. In consequence, the magnitude of the 2nd-order intermodulation generated depends upon the difference between f0 and fi, an instantaneous frequency determined by the instantaneous voltage vi of the main video signal. If the keyed AFC method is used for the transmission of a main carrier, the magnitude of the 2nd-order intermodulation becomes a function of the difference between fi and the frequency f0' corresponding to the voltage v0' in the keyed section of the main video signal when f0' is so set as to be in the center of the BPF.

If the picture subcarrier frequency is taken as fs and an arbitrary component of the main video signal frequency spectrum is taken as fb, the position of the frequency in the modulation signal at which the 2nd-order intermodulation occurs is represented by $fs \pm fb$. In this configuration, therefore, the main video signal spectrum is arranged on both sides of the picture subcarrier positioned in the center. The 2nd-order intermodulation amplitudes $Vfs+fb$ and $Vfs-fb$ in the frequency $fs \pm fb$ are given by the following equations as functions of $fi - f0$ or $vi - v0$:

$$[V\!f\!s + f\!b(vi - v0)]^2 = ((f\!s + f\!b)/\Delta f\!m)^2 \cdot \quad (2)$$

$$\left[\left[\sum_{rs}\Sigma Re[UFi]Jr(mfs) \cdot Jb(mfb)\{Jr - 1(mfs) \cdot Js - 1(mfb) - Jr + 1(mfs) \cdot Js + 1(mfb)\}\right]^2 + \right.$$

$$\left.\left[\sum_{rs}\Sigma\,\mathrm{Imag}[UFi] \cdot Jr(mfs)\{Js(mfb) \cdot Jr - 1(mfs)Js - 1(mfb) + Jr + 1(mfs) \cdot Js + 1(mfb)\}\right]^2\right]$$

$$[V\!f\!s + f\!b(vi - v0)]^2 = ((f\!s + f\!b)/\Delta f\!m)^2 \cdot \quad (3)$$

$$\left[\left[\sum_{rs}\Sigma Re[UFi]Jr(mfs) \cdot Jb(mfb)\{Jr - 1(mfs) \cdot Js + 1(mfb) - Jr + 1(mfs) \cdot Js - 1(mfb)\}\right]^2 + \right.$$

-continued $$\left[ \sum_{rs} \text{Imag}[UFi] \, Jr(mfs) \cdot Js(mfb) \, \{Jr - 1(mfs) \cdot Js + 1(mfb) + Jr + 1(mfs) \cdot Js - 1(mfb)\} \right]^2 \Big]$$

$Fi = (r \cdot fs \cdot s \cdot fb) + (fi - f0) = (r \cdot fs + s \cdot fb) + \Delta fm \cdot (vi - v0)$ ($r$ and $s$ are integers), where UFi represents, by way of a complex number, the amplitude and phase responses of the transmission line in the frequency Fi with the center of the transmission line as the origin. mfs and mfb are modulation indices of the main carrier in the frequencies fs and fb, and $\Delta$fm is the maximum frequency deviation of the main carrier. Jn(x) is a nth-order Bessel function. This theory has been described in FM Musen Kogaku pp 538–539, Sugawara et al., Nikkan Kogyo Shinbunsha.

This 2nd-order intermodulation in the modulation signal interferes with a picture subcarrier.

First, in the case of frequency modulation of a picture subcarrier, the amplitude Vc of an interference occurring to the sub video signal may be represented by the following equation when the ratio of the amplitude U of 2nd-order intermodulation to the amplitude D of the subcarrier is small:

$$Vc = (1/\Delta fs)(U/D)(fu - fd)\cos 2\pi (fu - fd)t \quad (4)$$

where fd is the instantaneous frequency of a picture subcarrier, fu is the instantaneous frequency of a 2nd-order intermodulation, and $\Delta$fs is the maximum frequency deviation of a subcarrier. This theory has been disclosed in FM Musen Kogaku pp 456–457 and p 604, Sugawara et al., Nikkan Kogyo Shinbunsha. Substitution of the Vfs−fd and Vfs−f derived from the equations (2) and (3) for the equation (4) gives the following equation:

$$Vc = KFM \cdot fb \cdot \cos 2\pi \, fb \, t \quad (5),$$

where KFM equals $(1/\Delta fs)(Vfs+fb-Vfs-fb)/D$. According to the equation (5), a main video signal with a frequency of fb also generates on the sub video signal an interference with a frequency of fb, whose magnitude is proportional to the amplitude of the 2nd-order intermodulation. Any fluctuations in the picture subcarrier frequency due to frequency modulation cause no change in the interference signal as the difference in frequency between the 2nd-order intermodulation and the picture subcarrier remains unchanged. The interference due to each frequency component of the main video signal is added on the sub video signal to cause crosstalk from the main to the sub video signal. However, each component of the interference calculated by multiplying the frequency in the equation (5) brings a differential waveform of the main signal to the crosstalk. The crosstalk is subject to an attenuation due to the coefficient term KFM. The value of this coefficient term is determined by the bias point of the main carrier on the transmission line. This bias point is determined by the main video signal as mentioned earlier.

Next, a case is considered where a picture subcarrier undergoes phase modulation. A 2nd-order intermodulation in the modulation signal causes the phase $\theta$ of the picture subcarrier to fluctuate. The amplitude of Vc of the interference occurring to the sub video signal may be represented by the following equation when the ratio of the amplitude U of the 2nd-order intermodulation to the amplitude D of the picture subcarrier is small:

$$Vc = (1/\Delta\theta)(U/D) \cos 2\pi(fu-fd)t \quad (6),$$

where $\Delta\theta$ is the maximum phase deviation of the picture subcarrier. This theory has been described in FM Musen Kogaku pp 449–451, Sugawara et al., Nikkan Kogyo Shinbunsha. Substitution of Vfs+fb and Vfs−fb derived from the equations (2) and (3) for the equation (6) gives the following equation:

$$Vc = KPM \cdot \cos 2\pi \, fb \, t \quad (7),$$

where KPM equals $(1/\Delta\theta)(Vfs+fb-Vfs-fb)/D$. According to the equation (7), a main video signal with a frequency of fb also generates on the sub video signal an interference with a frequency of fb, whose magnitude is proportional to the amplitude of the 2nd-order intermodulation. The interference due to each frequency component of the main video signal is added on the sub video signal to cause crosstalk from the main video signal to the sub video signal. The crosstalk is also subject to an attenuation due to the coefficient term KPM. The value of this coefficient term is determined by the bias point of the main carrier on the transmission line. This bias point is determined by the main video signal as mentioned earlier.

Then, a case is considered of amplitude modulation of a picture subcarrier. A 2nd-order intermodulation in the modulation signal causes fluctuations of the subcarrier's amplitude D, which may be represented by the following equation when the ratio of the amplitude U of the 2nd-order intermodulation to the amplitude D is small:

$$D' = D\{1 + (U/D) \cos 2\pi(fu-fd)t\} \quad (8).$$

This theory has been disclosed in FM Musen Kogaku pp 447–449, Sugawara et al., Nikkan Kogyo Shinbunsha. According to the equation (8), the picture subcarrier is subjected to amplitude modulation by the frequency $|fu-fd|$ and the modulation degree U/D. The crosstalk signal Vc may, therefore, be represented by the following equation using the equation (8) and Vfs+fb and Vfs−fb derived from the equations (2) and (3):

$$Vc = KAM \cdot \cos 2\pi \, fb \, t \quad (9),$$

where KAM equals $(Vfs+fb-Vfs-fb)/D$. According to the equation (9), the main video signal with a frequency of fb also generates on the sub video signal an interference with a frequency of fb, whose magnitude is proportional to the amplitude of the 2nd-order intermodulation. The interference due to each frequency component of the main video signal is added on the sub video signal to cause crosstalk from the main to the sub video signal. The crosstalk is also subject to an attenuation due to the coefficient term KAM. The value of this coefficient term is determined by the bias point of the main carrier on the transmission line. This bias point is determined by the main video signal as mentioned earlier.

A similar phenomenon that has so far been known is the crosstalk from the main video signal to the sub audio signal that takes place at the time of multiplex propagation of an FM—FM multiplexed TV sound multiplex broadcasting wave. In order to improve this crosstalk, a method has been proposed where a crosstalk correction signal prepared by letting an FM—FM multiplex wave pass through an AM demodulator, a differentiator, an attenuator, and an inverter is added to the sub audio signal on the strength of an assumed advantage that the differential waveform of an FM—FM multiplex wave envelope curve is similar to crosstalk. Such a method has been disclosed in the Japanese Patent Publication No. 57-26469 (1982).

In satellite transmission, however, it is difficult to obtain a correction signal from an FM multiplex wave envelope curve. There are two reasons for this. The first reason is that the nonlinear amplification behavior of a transponder TWTA within a satellite distorts the information on the amplitude of an FM multiplex wave. The second is that, in satellite transmission, the very small power to transmit an FM multiplex wave lowers the C/N ratio at the time a signal is received, allowing the AM demodulated output of the FM multiplex wave to give a much lower S/N ratio than the demodulated video signal transmitted by FM. Hence, such a conventional method of reducing crosstalk has not applicable in the case of satellite transmission.

SUMMARY OF THE INVENTION

An object of this invention is to provide a transmission apparatus in which improvement has been made in the main-to-sub signal crosstalk generated by the limited bandwidth of a transmission line in a multiplex transmission system where a main carrier is subjected to frequency modulation by a baseband signal obtained by modulating, by means of a sub signal, a subcarrier with a frequency set higher than that of the main signal.

In order to achieve the above object, a transmission apparatus of this invention adds to either the transmitting or receiving side a circuit for producing a crosstalk correction signal equal in magnitude but negative in phase to the crosstalk from the main signal to the sub signal on the basis of the transmission line amplitude and phase frequency responses and the main signal. Addition of the circuit to the transmitting side enables the crosstalk which occurs after a signal is received and demodulated to be offset and, therefore, improved by a correction signal if the correction signal is modulated and sent after added to the sub signal. When such a circuit is attached to the receiving side, the crosstalk is improved if the crosstalk correction signal produced within the receiver from the received and demodulated main signal is added to the demodulated sub signal.

DESCRIPTION OF THE PREFERRED EMBODIMENTS

Figure 1:
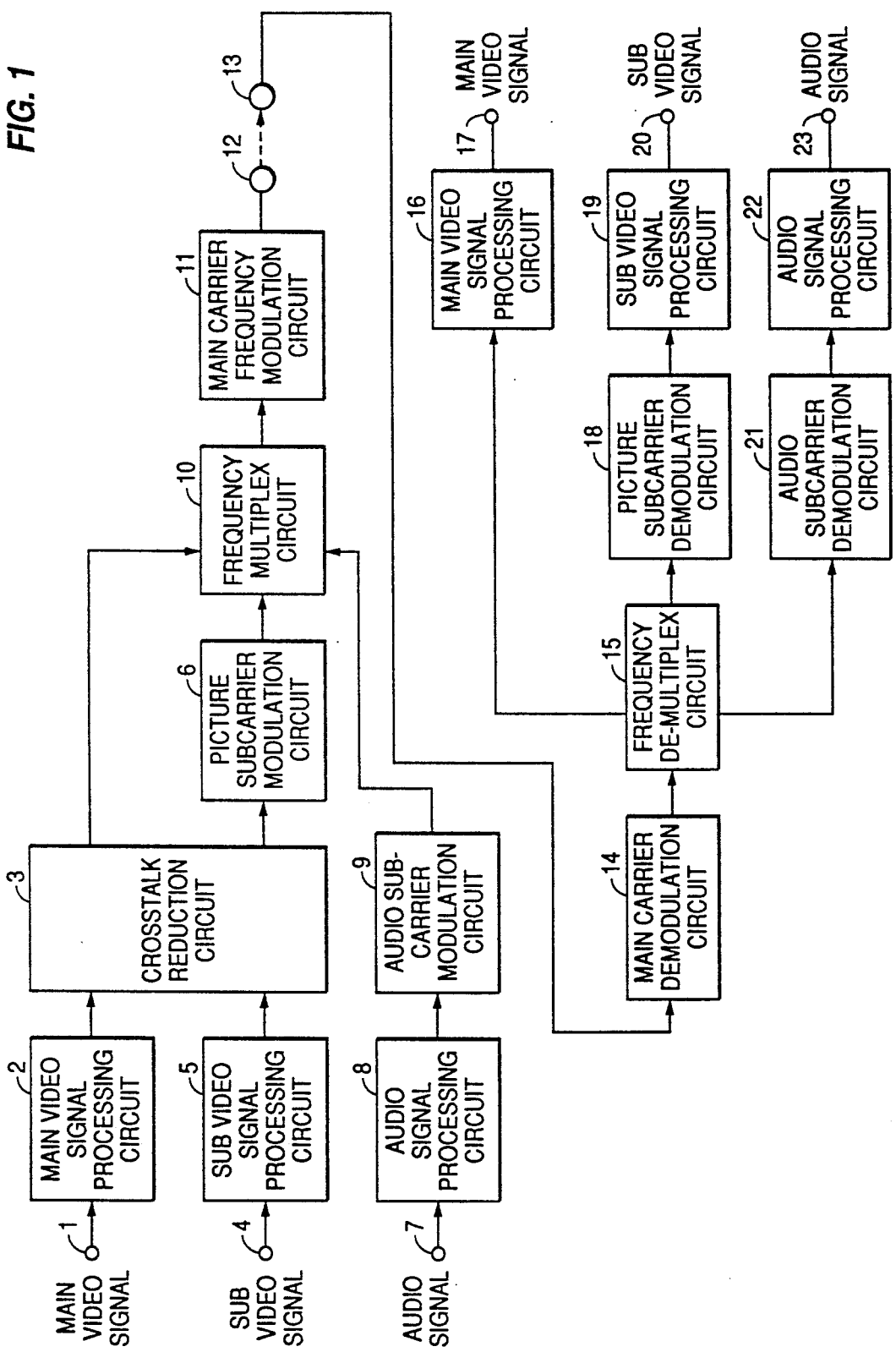
FIG. 1 is a block diagram of a transmission apparatus with a crosstalk reduction circuit attached to the transmitting side showing the process from the generation to the reproduction of a satellite broadcasting signal in the first embodiment of this invention.
Figure 2:
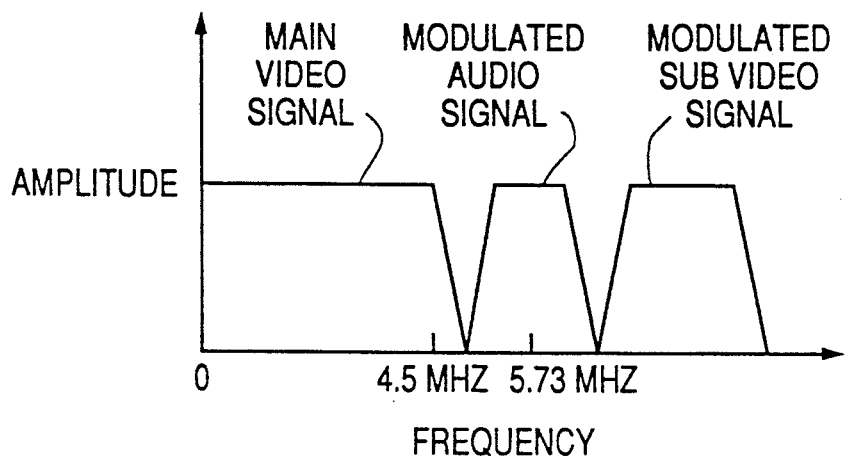
FIG. 2 is a diagram showing the modulation signal frequency arrangement of a satellite broadcasting signal common to all embodiments of this invention.

FIG. 1 shows a transmission apparatus of this invention with a crosstalk reduction circuit attached to the transmitting side in the first embodiment. In FIG. 1, the main video signal enters the main video signal processing circuit 2 at the terminal 1 to receive the band limitation and pre-emphasis processings. The main video signal thus converted into a video signal suitable for satellite transmission is outputted to the crosstalk reduction circuit 3. On the other hand, a sub video signal inputted to a terminal 4 may be subjected to a proper signal processing in a sub video signal processing circuit 5 before entering the crosstalk reduction circuit 3. A picture subcarrier modulation circuit 6 in FIG. 1 may be a frequency modulation circuit, an amplitude modulation circuit or a phase modulation circuit. In the case where the picture subcarrier modulation circuit 6 is a frequency modulation circuit, the sub video signal processing circuit 5 may be a pre-emphasis circuit for subjecting the sub video signal inputted thereto to pre-emphasis. In the case where the picture subcarrier modulation circuit 6 is an amplitude modulation circuit or a phase modulation circuit, the sub video signal may not be subjected to any signal processing before entering the crosstalk reduction circuit 3, that is, the sub video processing circuit 5 may be omitted. In the crosstalk reduction circuit 3, a signal equal in magnitude but negative in phase to the crosstalk from the main video signal to the sub video signal is prepared on the basis of the signal outputted from the main video signal processing circuit 2 to be added to the output signal of the sub video signal processing circuit 5. The crosstalk reduction circuit 3 also functions to delay the output signal of the main video signal processing circuit 2 by the amount of a delay of the sub video signal from the main video signal to be caused by the picture subcarrier modulation circuit 6. The output signal of the main video signal processing circuit 2 delayed by the crosstalk reduction circuit 3 is outputted to the frequency multiplex circuit 10. At the same time, the output signal of the sub video signal processing circuit 5 to which a crosstalk correction signal has been added is inputted to the picture subcarrier modulation circuit 6. In the picture subcarrier modulation circuit 6, a picture subcarrier with a frequency arranged higher than those of the main video signal and audio subcarrier is generated to undergo amplitude, frequency, or phase modulation. Then, the signal is outputted to the frequency multiplex circuit 10. Meanwhile, the audio signal enters the audio signal processing circuit 8 at the terminal 7 to be converted from an analog to a PCM digital audio signal. In the audio subcarrier modulation circuit 9, generated audio subcarrier with a frequency of 4.727272 MHz undergoes QPSK modulation to be outputted to the frequency multiplex circuit 10. In the frequency multiplex circuit 10, the main video signal, the modulated sub video signal, and the modulated audio signal are subjected to frequency multiplexing along the baseband frequency axis as shown FIG. 2. In the main carrier frequency modulation circuit 11, a main carrier is generated to undergo frequency modulation by the multiplex signal produced in the frequency multiplex circuit 10. The signal is then outputted from the terminal 12 to a broadcasting satellite. The signal received from the broadcasting satellite enters the terminal 13 to be inputted to the main carrier (frequency) demodulation circuit 14. In the main carrier demodulation circuit 14, the signal that has undergone the frequency multiplexing as shown in FIG. 2 is reproduced and then input to the frequency de-multiplex circuit 15 to be divided into the main video signal, the modulated sub video signal, and the modulated audio signal. The main video signal component is inputted to the main video signal processing circuit 16 and receives the de-emphasis processing to be outputted to the terminal 17 as the demodulated main video signal. The modulated sub video signal component is demodulated, in the picture subcarrier demodulation circuit 18, by the demodulation method used corresponding to the modulation method in the picture subcarrier modulation circuit 6. The demodulated signal receives the de-emphasis and band limitation processings in the sub video signal processing circuit 19 to be outputted to the terminal 20 as a demodulated sub video signal if the signal has undergone frequency modulation in the picture subcarrier modulation circuit 6. However, the signal which has undergone amplitude or phase modulation in the picture subcarrier modulation circuit 6 receives only the band limitation processing in the sub video signal processing circuit 19 and is outputted to the terminal 20 as a demodulated sub video signal. On the other hand, the modulated audio signal component is subjected to QPSK demodulation in the audio subcarrier demodulation circuit 21 and a PCM digital signal is reproduced. In the audio signal processing circuit 22, the PCM digital audio signal is decoded and converted into an analog signal to be outputted to the terminal 23 as a demodulated audio signal. As shown above, in this embodiment, the main-to-sub signal crosstalk generated on the transmission line of the main carrier is improved as it is offset with the crosstalk correction signal that has been added to the sub signal by the crosstalk reduction circuit on the transmitting side. In addition, the crosstalk reduction circuit is a composition which may be provided only on the transmitting side, requiring no change on the receiving side at all.

Figure 3:
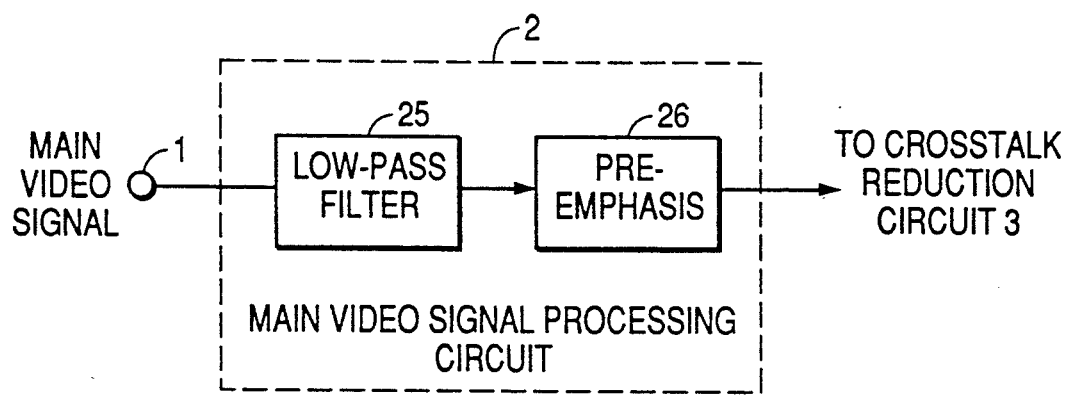
FIG. 3 is a block diagram showing an example of the main signal processing circuit on the transmitting side in the first embodiment of this invention.

FIG. 3 is a block diagram of the main video signal processing circuit 2 on the transmitting side. The main video signal input from the terminal 1 enters the low-pass filter 25 to undergo the band limitation to 4.5 MHz. Subsequently, in the pre-emphasis circuit 26, the signal is subjected to pre-emphasis on higher frequencies and damping on lower ones to compensate the frequency demodulation-caused deterioration of the S/N ratio in the high-frequency area along the baseband frequency axis and then outputted to the next stage of the crosstalk reduction circuit 3. For reference, the characteristics of pre-emphasis are described in the Research Report on the Satellite Broadcasting Signal Receiving Techniques of a Satellite Broadcasting Transmitter-Receiver (a targeted rating) Part 1 app. p 9, Radio Engineering and Electronics Association (June, 1983).

Figure 4:
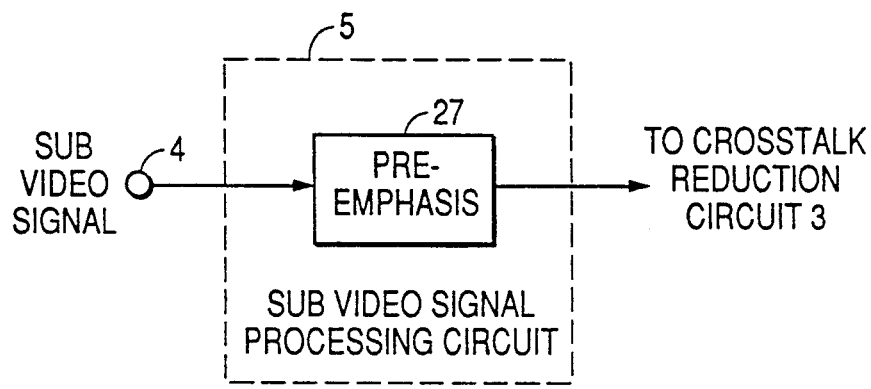
FIG. 4 is a block diagram showing an example of the sub signal processing circuit on the transmitting side in the first embodiment of this invention.

FIG. 4 is a block diagram of the sub video signal processing circuit 5 on the transmitting side. The sub video signal inputted from the terminal 4 is processed to be outputted to the next stage of the crosstalk reduction circuit 3. In the sub video signal processing circuit 5, the signal receives the pre-emphasis processing if the picture subcarrier modulation circuit 6 is a frequency modulation circuit. The characteristics of pre-emphasis are different from those of pre-emphasis in the main video signal processing circuit 2 as the zero-gain frequency in one band of the video signal differs from that in another. On the other hand, in the case where the picture subcarrier modulation circuit 6 is an amplitude or phase modulation circuit, no such processings take place and the sub video signal processing circuit 5 may be omitted.

Figure 5:
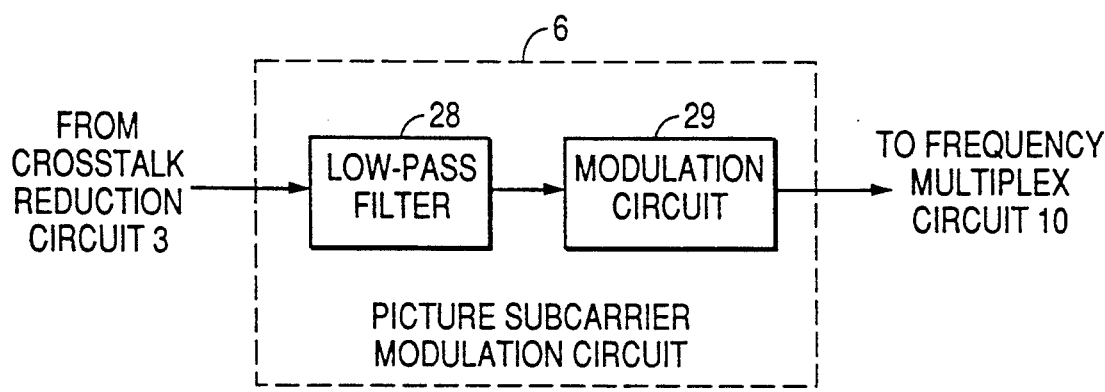
FIG. 5 is a block diagram showing an example of the picture subcarrier modulation circuit in the first embodiment or this invention.

FIG. 5 is a block diagram of the picture subcarrier modulation circuit 6. The crosstalk correction signal-added sub video signal input from the preceding stage of the crosstalk reduction circuit 3 is subject to the band limitation by the low-pass filter 28. In the modulation circuit 29, a picture subcarrier with a frequency arranged higher than those of the main video signal and audio subcarrier is generated. The picture subcarrier is modulated with the output signal from the low-pass filter 28 by an amplitude, frequency, or phase modulation method. The modulated sub video signal is outputted to the next stage of frequency multiplex circuit 10.

Figure 6:
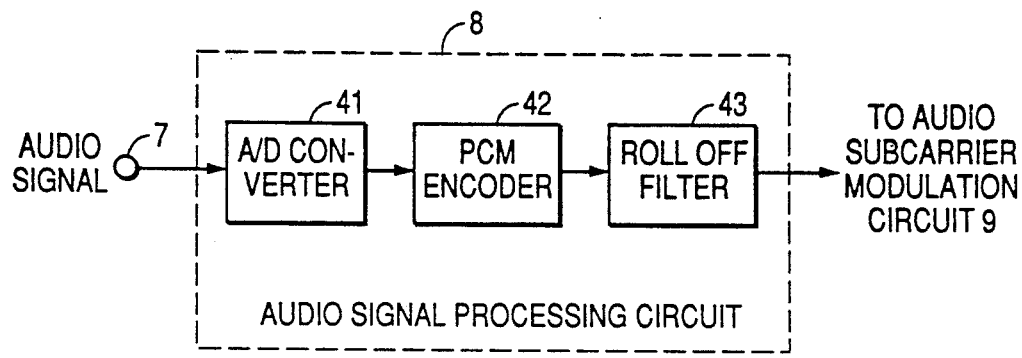
FIG. 6 is a block diagram showing an example of the audio signal processing circuit on the transmitting side of this invention.

FIG. 6 is a block diagram of the audio signal processing circuit 8 on the transmitting side. The analog audio signal inputted from the terminal 7 is converted into a digital signal by the A/D converter 41 using a sampling frequency of 32 KHz or 48 KHz. Then, the signal is encoded into a PCM signal by the PCM encoder 42 for the subsequent addition of a frame synchronizing signal, control codes, independent data, and an error correcting code to become a digital signal of 2.048 Mbps. The resulting digital signal is subjected to the band limitation by the roll off filter 43 to be outputted to the next stage of the audio subcarrier modulation circuit 9.

Figure 7:
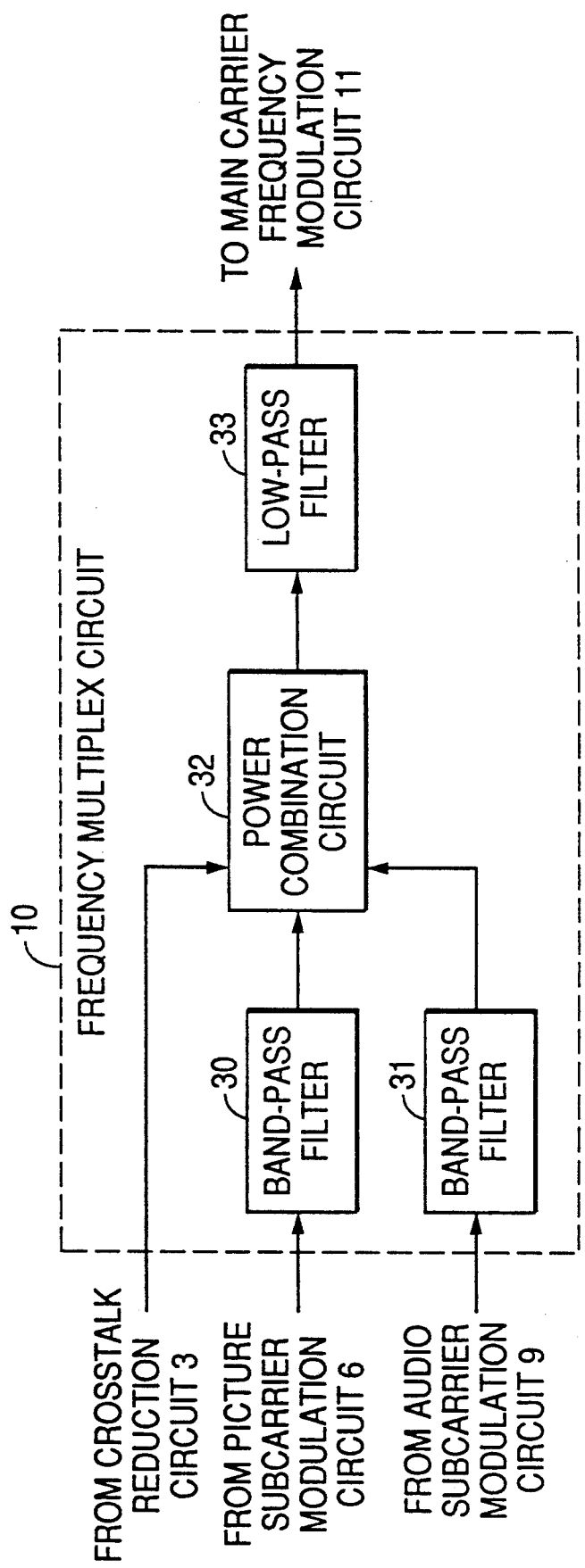
FIG. 7 is a block diagram showing an example of the frequency multiplex circuit in the first embodiment of this invention.

FIG. 7 is a block diagram of the frequency multiplex circuit 10. The main video signal input from the preceding stage of crosstalk reduction circuit 3 enters the power combination circuit 32. The output signal from the preceding picture subcarrier modulation circuit 6 undergoes the band limitation by the band-pass filter 30 to be inputted to the power combination circuit 32. At the same time, the output from the preceding audio subcarrier modulation circuit 9 undergoes the band limitation by the band-pass filter 31 to be inputted to the power combination circuit 32. The above enables the main video signal, the modulated sub video signal, and the modulated audio signal to be arranged along the baseband frequency axis without interfering with each other. The resulting multiplex signal is subjected to the band limitation by the low-pass filter 33 for subsequent output to the following main carrier frequency modulation circuit 11. For reference, one of the power combination circuits is found as a composite resistance circuit or an adder employing an operational amplifier.

Figure 8:
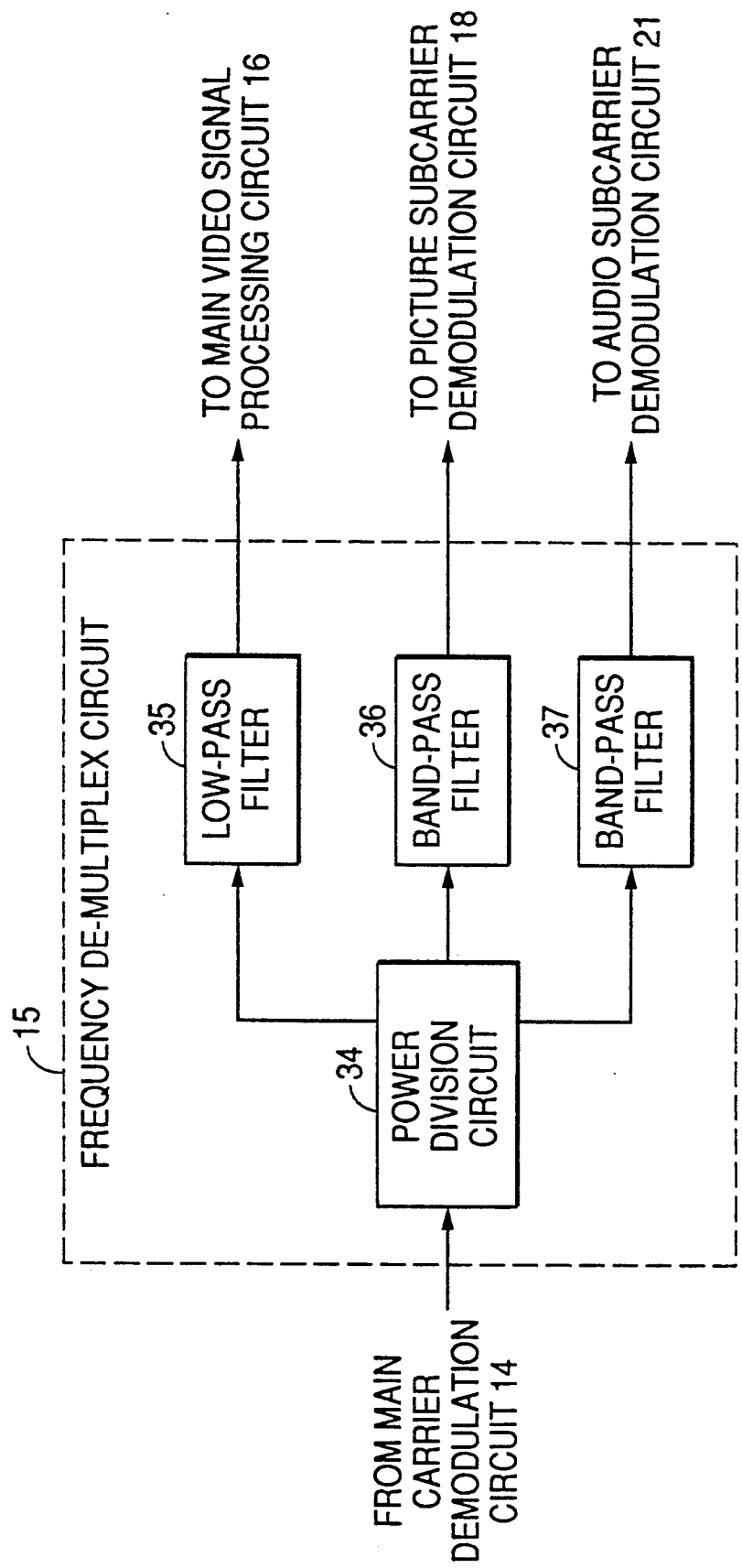
FIG. 8 is a block diagram showing an example of the frequency de-multiplex circuit in the first embodiment of this invention.

FIG. 8 is a block diagram of the frequency de-multiplex circuit 15. The demodulated signal input from the preceding main carrier demodulation circuit 14 enters the power division circuit 34 and is divided into three components to be distributed to the low-pass filter 35, the band-pass filter 36, and the band-pass filter 37. The low-pass filter 35, due to its band limitation to 4.5 MHz, only separates the main video signal component to be outputted to the next stage of the main video signal processing circuit 16. The bandpass filter 36, having the same frequency response as the band-pass filter 30 used in the frequency multiplex circuit 10, only separates the modulated sub video signal component to be outputted to the following picture subcarrier demodulation circuit 18. Meanwhile, the band-pass filter 37 with the same frequency response as the band-pass filter 31 used in the frequency multiplex circuit 10 only separates the modulated audio signal component and outputs it to the audio subcarrier demodulation circuit 21. For reference, one of the power division circuits is found as a distributed resistance circuit.

Figure 9:
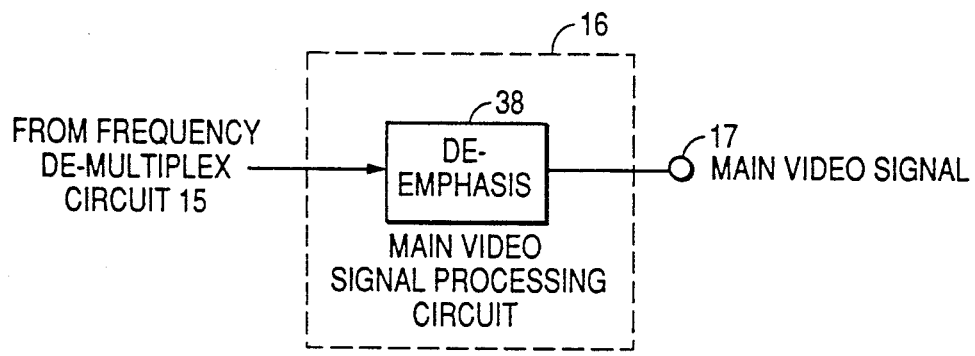
FIG. 9 is a block diagram showing an example of the main video signal processing circuit on the receiving side in the first embodiment of this invention.

FIG. 9 is a block diagram of the main signal processing circuit 16 on the receiving side. The main video signal component input from the preceding frequency de-multiplex circuit 15 is subjected, in the de-emphasis circuit 38, to processing which is reverse in characteristics to that carried out in the pre-emphasis circuit 26. The signal thus restored to the flat frequency response signal with the original characteristics is outputted to the terminal 17 as a demodulated main video signal.

Figure 10:
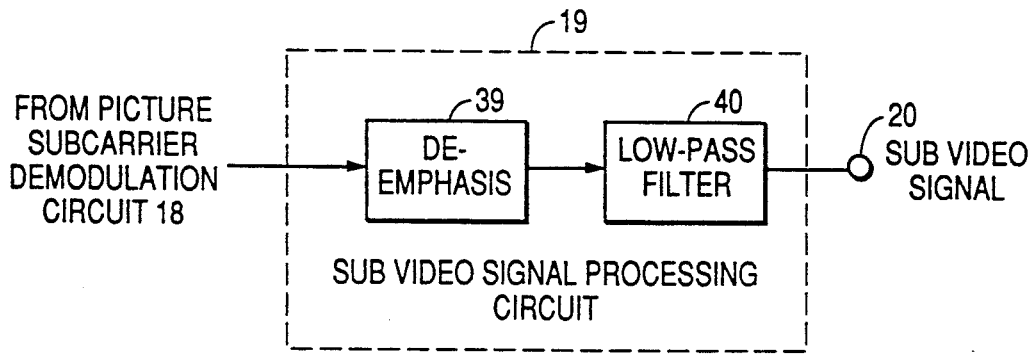
FIG. 10 is a block diagram showing an example of the sub signal processing circuit on the receiving side in the first embodiment of this invention.

FIG. 10 is a block diagram of the sub video signal processing circuit 19 on the receiving side. If the picture subcarrier modulation circuit 6 is a frequency modulation circuit, the sub video signal input from the preceding stage of picture subcarrier demodulation circuit 18 receives, in the de-emphasis circuit 39, processing which is reverse in characteristics to that carried out in the pre-emphasis circuit 27. Thus, the signal is restored to the flat frequency response signal with the original characteristics and, after undergoing the band limitation by the low-pass filter 40, is outputted to the terminal 20 as a demodulated sub video signal. In the case where the picture subcarrier modulation circuit 6 is an amplitude or phase modulation circuit, no de-emphasis circuit 39 is required and the sub video signal input from the preceding picture subcarrier demodulation circuit 18 is subjected to the band limitation by the low-pass filter 40 to be outputted to the terminal 20 as a demodulated sub video signal.

Figure 11:
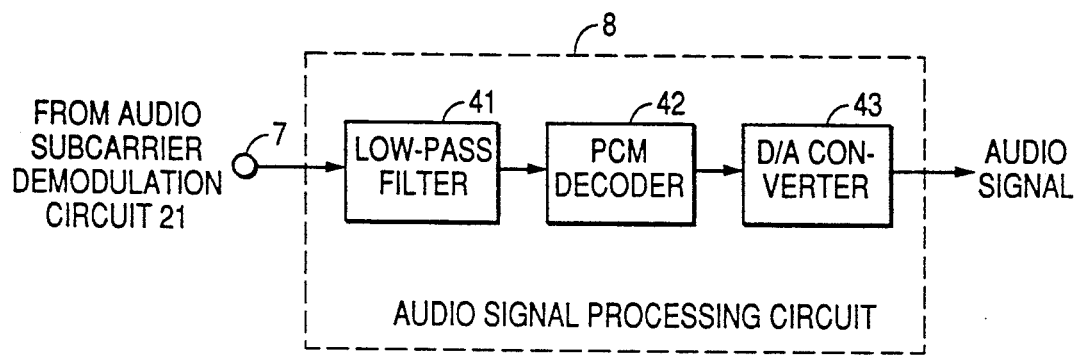
FIG. 11 is a block diagram showing an example of the audio signal processing circuit on the receiving side of this invention.

FIG. 11 is a block diagram of the audio signal processing circuit 22 on the receiving side. The digital signal input from the audio subcarrier demodulation circuit 21 is subjected to the band limitation by the low-pass filter 44. The signal receives such a processing as error correction by a PCM decoder 45 to be reproduced as a digital audio signal, which is then converted into an analog audio signal by the D/A converter 46 to be output from the terminal 23. For reference, the low-pass filter 44 is a simplified roll off filter on the receiving side.

Figure 12:
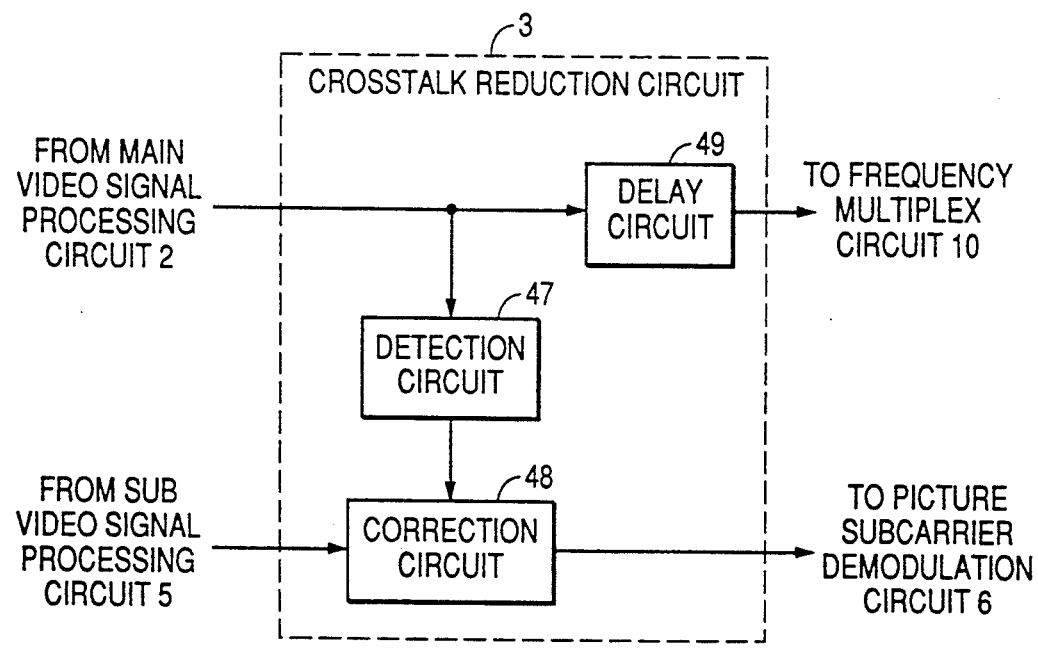
FIG. 12 is a block diagram showing an example of the crosstalk reduction circuit in the first embodiment of this invention.

FIG. 12 is a block diagram of the crosstalk reduction circuit 3 in the first embodiment of this invention. The main video signal that has received the processings of band limitation and pre-emphasis in the preceding main video signal processing circuit 2 is inputted to the detection circuit 47 and the delay circuit 49. The amount of instantaneous frequency deviation of the main carrier frequency from the central frequency on the transmission line determines the amount of crosstalk from the main to the sub video signal. This is why the detection circuit 47 detects this instantaneous frequency deviation. Here, the instantaneous frequency deviation of the main carrier increases in proportion to the instantaneous voltage of the modulation signal as the main carrier undergoes frequency modulation. Meanwhile, the modulation signal is the main video signal on which the audio and picture subcarriers are superimposed. This means that the bias point on the transmission line of the main carrier is determined, as the base for the crosstalk to the sub video signal, by the main video signal processed in the main video signal processing circuit 2. The detection circuit 47 is, therefore, only required to detect the difference between the instantaneous voltage of the main video signal and the voltage which corresponds, after frequency modulation of the main carrier, to the central frequency on the transmission line. The correction circuit 48 attenuates the main video signal in accordance with the output of the detection circuit 47 to prepare a crosstalk correction signal. For reference, the output of the detection circuit 47 is used as the main video signal to be input to the correction circuit 48 since such an output is a main video signal that has undergone a change only on the d-c level. The resulting crosstalk correction signal is added to the output from the preceding stage of sub video signal processing circuit 5 to be outputted to the next stage of the picture subcarrier modulation circuit 6. In the delay circuit 49, a delay takes place in the same amount as in the picture subcarrier modulation circuit 6. The input from the preceding main video signal processing circuit 2 receives an adjustment by the delay circuit 49 of the time difference from the sub video signal side and is outputted to the next stage of the frequency multiplex circuit 10. Unless this delayed time is adjusted, a time difference is generated between the added crosstalk correction signal and the actual crosstalk to be created, hampering the reduction of crosstalk. It is also necessary to consider the total delayed time $\tau 2$ in the detection circuit 47 and the correction circuit 48 if not negligible. In this case, the delayed time $\tau 1$ in the delay circuit 49 is given by the equation of $\tau 1 = \tau 0 + \tau 2$ with the delayed time in the picture subcarrier modulation circuit 6 taken as $\tau 0$.

Figure 13:
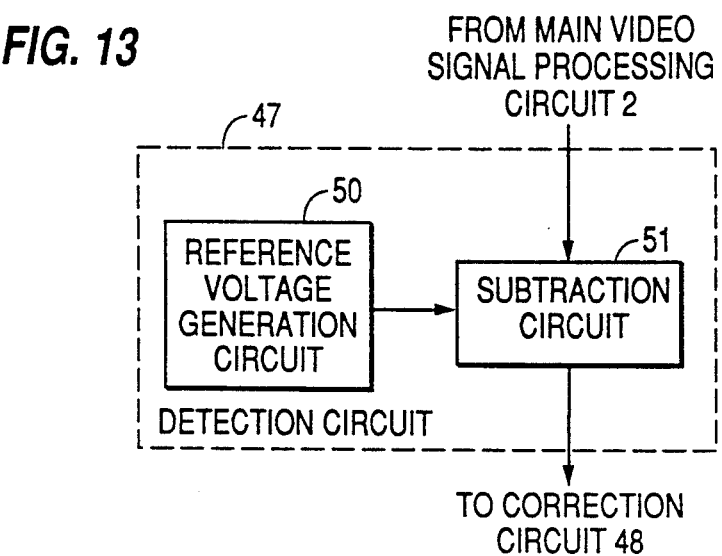
FIG. 13 is a block diagram showing an example of the detection circuit as an element composing the crosstalk reduction circuit in the first embodiment of this invention.

FIG. 13 is a block diagram of the detection circuit 47 in the first embodiment of the transmission apparatus of this invention. The output from the preceding stage of the main video signal processing circuit 2 is inputted to the subtraction circuit 51. In the subtraction circuit 51, the difference from the reference voltage generation circuit 50 is detected to be outputted to the succeeding stage of the correction circuit 48. In the reference voltage generation circuit 50, a main video signal voltage is generated which corresponds, after the frequency modulation of the main carrier, to the central frequency on the transmission line. In other words, if the main carrier is transmitted by the averaging AFC method, APL is generated as the average d-c level of the main video signal. On the other hand, in the case where the main carrier is transmitted by the keyed AFC method, the keyed-section voltage of the main video signal is generated. For reference, an operational amplifier is one of the subtraction circuits.

Figure 14:
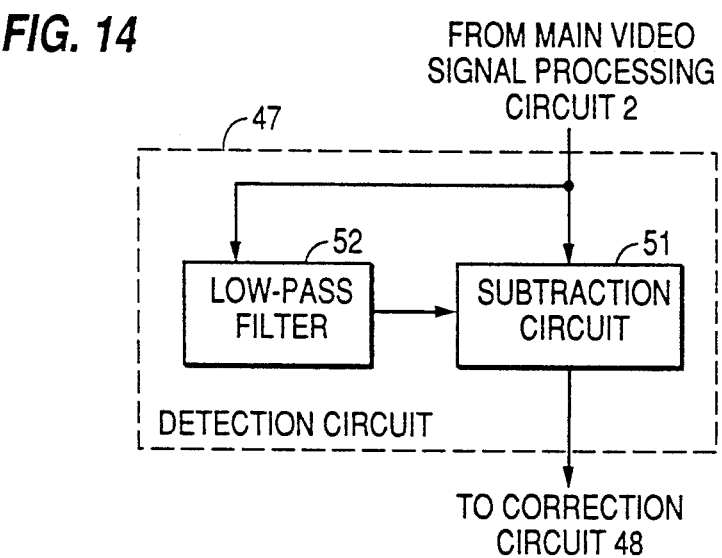
FIG. 14 is a block diagram showing an example of the detection circuit as an element composing the crosstalk reduction circuit in the case of transmission of a main carrier by the averaging AFC method in the first embodiment of this invention.

FIG. 14 is a block diagram of the detection circuit 47 in the case of transmission of a main carrier by the averaging AFC method in the first embodiment of the transmission apparatus of this invention. The main video signal input from the preceding stage of the main video signal processing circuit 2 is inputted to the subtraction circuit 51 and the low-pass filter 52. The low-pass filter 52, which characteristically extracts only the DC component with a narrow band, detects APL of the main video signal. In the subtraction circuit 51, the available difference between the output of the main video signal processing circuit 2 and the output of the low-pass filter 52 determines the difference between the instantaneous voltage of the main video signal and APL of the main video signal. This difference is outputted to the next stage of the correction circuit 48. An operational amplifier is one of the subtraction circuits.

Figure 15:
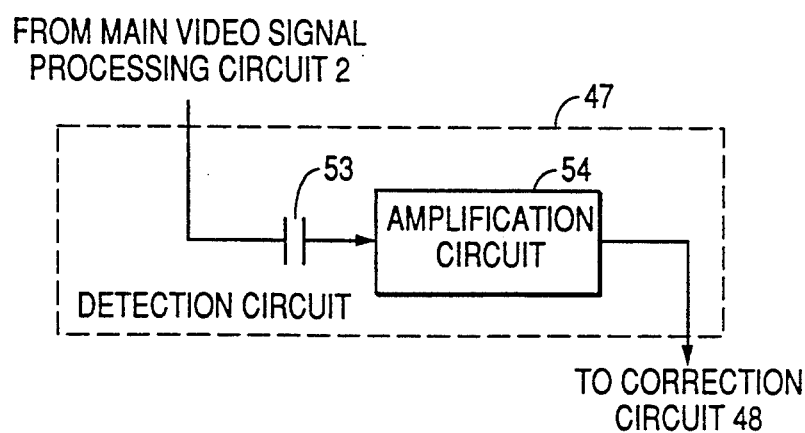
FIG. 15 is a block diagram showing a modified example of the detection circuit as an element composing the crosstalk reduction circuit in the case of transmission of a main carrier by the averaging AFC method in the first embodiment of this invention.

FIG. 15 is a block diagram showing a modified version of the detection circuit 47 in the case of transmission of a main carrier by the averaging AFC method in the first embodiment of the transmission apparatus of this invention. The main video signal input from the preceding main video signal processing circuit 2 is inputted to the amplification circuit 54 by way of a capacitor. The input impedance of the amplification circuit 54 and the capacitor 53 form a high-pass filter. This high-pass filter eliminates the DC component alone if the capacitance value of the capacitor 53 is selected appropriately. The output of the amplification circuit 54 is, therefore, the difference between the instantaneous voltage of the main video signal and APL of the main video signal. This difference is outputted to the following stage of the correction circuit 48.

Figure 16:
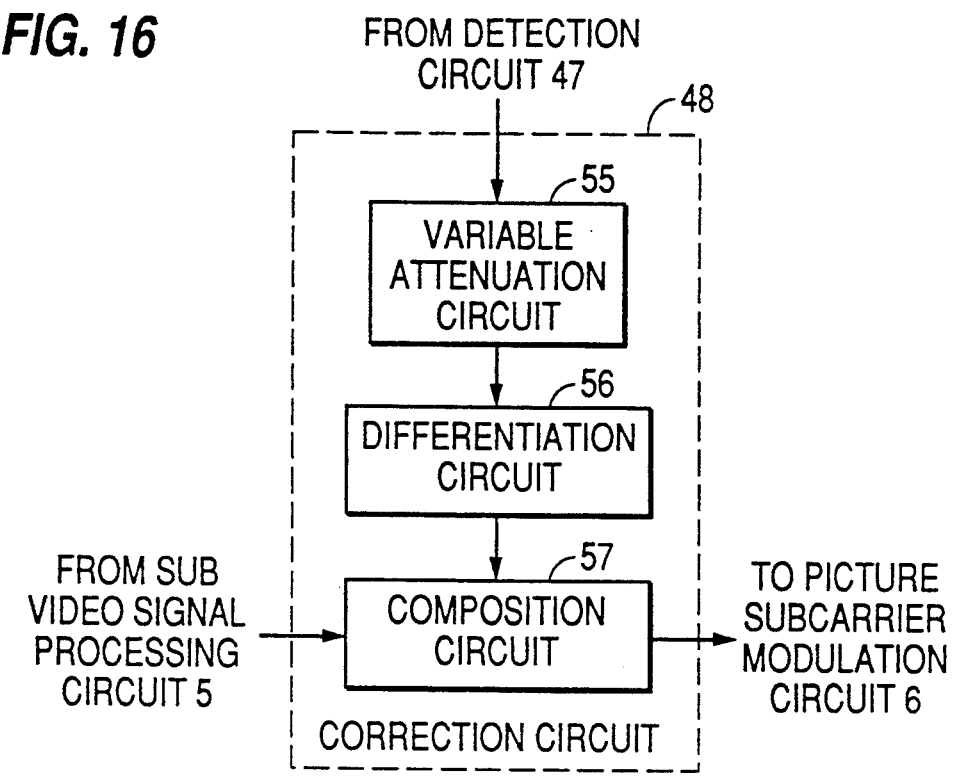
FIG. 16 is a block diagram showing an example of the correction circuit as an element composing the crosstalk reduction circuit in the case of frequency modulation of a subcarrier in the first embodiment of this invention.

FIG. 16 is a block diagram of the correction circuit 48 in the case of the picture subcarrier modulation circuit 6 being a frequency modulation circuit in the first embodiment of the transmission apparatus of this invention. The output of the preceding stage of the detection circuit 47 is inputted to the variable attenuation circuit 55. In the variable attenuation circuit 55, the main video signal is attenuated in accordance with the output of the detection circuit 47 to invert the polarity. KFM of the equation (5) is used for the characteristics of attenuation. The output of the detection circuit 47 is used as the main video signal since such an output is a main video signal that has undergone a change only on the DC level. The output of the variable attenuation circuit 55 is input to the differentiation circuit 56 to be differentiated along the time axis. The above shows how to prepare a crosstalk correction signal equal in magnitude but negative in phase to the crosstalk from the main video signal to the sub video signal. This correction signal is added to the output from the preceding stage of the sub video signal processing circuit 5 in the composition circuit 57 to be outputted to the next stage of the picture subcarrier modulation circuit 6. For reference, a differentiation circuit can be realized by a high-pass filter's slope section of +6dB/oct. or a digital difference circuit that calculates the difference between the adjacent sample points. An operational amplifier is one of the composition circuits.

Figure 17:
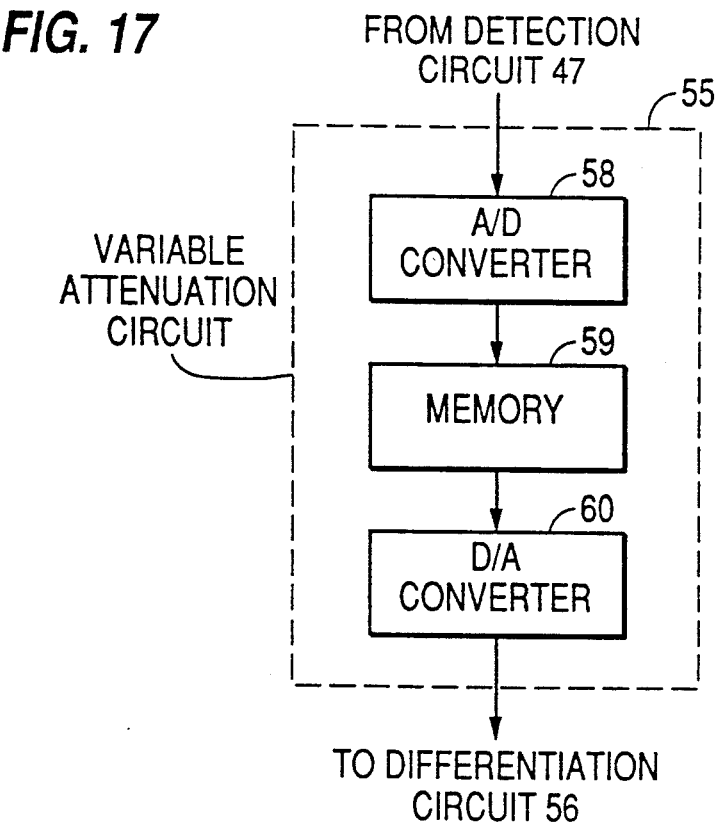
FIG. 17 is a block diagram showing an example of the variable attenuation circuit as an element composing the correction circuit in the case of frequency modulation of a subcarrier in this invention.

FIG. 17 is a block diagram of the variable attenuation circuit 55 in the case of the picture subcarrier modulation circuit 6 being a frequency modulation circuit in the transmission apparatus of this invention. The variable attenuation circuit 55 in FIG. 17 is composed in the same manner regardless of whether the crosstalk reduction circuit is located on the transmitting or the receiving side. The signal input from the preceding detection circuit 47 is converted into a digital signal by the A/D converter 58. The converted input signal is sent out to the address line of the memory 59. In the memory 59, the data located as designated by the address are read out to be outputted to the data line. The data output is converted into an analog signal by the D/A converter 60 and outputted to the next differentiation circuit 56. The above composition enables easy realization of an attenuation circuit with nonlinear input-output and output characteristics. However, digital processing in the preceding detection circuit 47 and the next differentiation circuit 56 requires a corresponding change in the location of the A/D converter 58 and the D/A converter 60.

Figure 18:
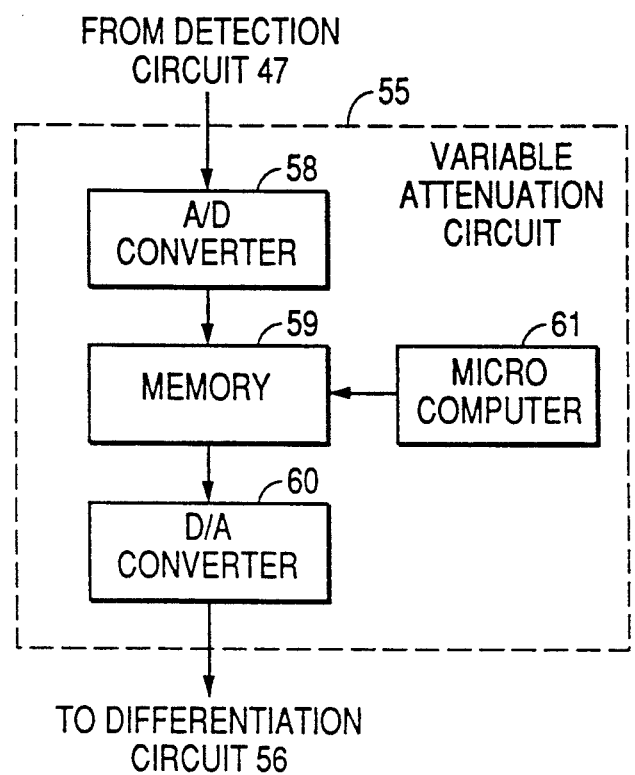
FIG. 18 is a block diagram showing a modified example of the variable attenuation circuit as an element composing the correction circuit in the case of frequency modulation of a subcarrier in this invention.

FIG. 18 is a block diagram showing a modified version of the variable attenuation circuit 55 in the case of the picture subcarrier modulation circuit 6 being a frequency modulation circuit in the transmission apparatus of this invention. The variable attenuation circuit 55 in FIG. 18 is composed in the same manner regardless of whether the crosstalk reduction circuit is located on the transmitting or the receiving side. This composition differs from that in FIG. 17 only in that the data of the memory 59 can be changed at any time by sending data from the microcomputer 61 to the memory 59. This can adapt a crosstalk correction signal to a change in the amount of crosstalk due to the fluctuations of the state of the main carrier transmission line. In the case where a crosstalk reduction circuit is established on the receiving side, realization of a means to detect the amount of residual crosstalk on the receiving side leads to further improvement of crosstalk through the formation of a closed loop to change the data of the memory 59 from time to time so that the amount of residual crosstalk is minimized.

Figure 19:
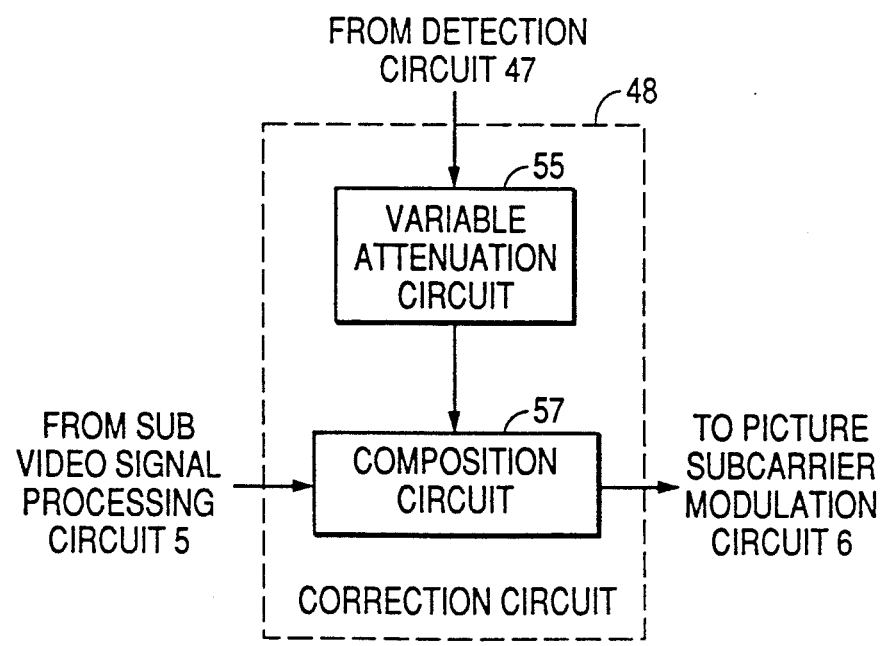
FIG. 19 is a block diagram showing an example of the correction circuit as an element composing the crosstalk reduction circuit in the case of amplitude or phase modulation of a subcarrier in the first embodiment of this invention.

FIG. 19 is a block diagram of the correction circuit 48 in the case of the picture subcarrier modulation circuit 6 being an amplitude or phase modulation circuit in the first embodiment of the transmission apparatus of this invention. The output from the preceding stage of the detection circuit 47 goes to the variable attenuation circuit 55. In the variable attenuation circuit 55, the main video signal is attenuated in accordance with the output of the detection circuit 47 to invert the polarity. For the characteristics of attenuation, KPM of the equation (7) is used in the case where the picture subcarrier modulation circuit 6 is a phase modulation circuit and KAM of the equation (9) is used when such a circuit 6 is an amplitude modulation circuit. The output of the detection circuit 47 is used as the main video signal since such an output is a main video signal that has undergone a change only on the DC level. The above shows how to prepare a crosstalk correction signal equal in magnitude but negative in phase to the crosstalk from the main to the sub video signal. This correction signal is added to the output from the preceding stage of sub video signal processing circuit 5 in the composition circuit to be output to the next stage of the picture subcarrier modulation circuit 6. For reference, one of the composition circuits is found as an operational amplifier.

Figure 20:
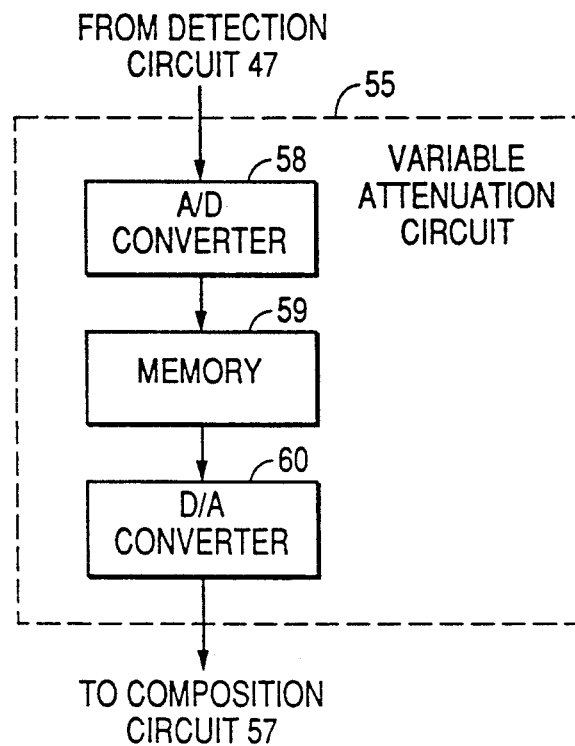
FIG. 20 is a block diagram showing an example of the variable attenuation circuit as an element composing the correction circuit in the case of amplitude or phase modulation of a subcarrier in this invention.

FIG. 20 is a block diagram of the variable attenuation circuit 55 in the case of the picture subcarrier modulation circuit 6 being an amplitude or phase modulation circuit in the transmission apparatus of this invention. The variable attenuation circuit 55 in FIG. 20 is composed in the same manner regardless of whether the crosstalk reduction circuit is located on the transmitting or the receiving side. This composition is entirely identical to that in FIG. 17 except that no differentiation circuit is used and the output of the variable attenuation circuit 55 directly goes to the composition circuit 57.

Figure 21:
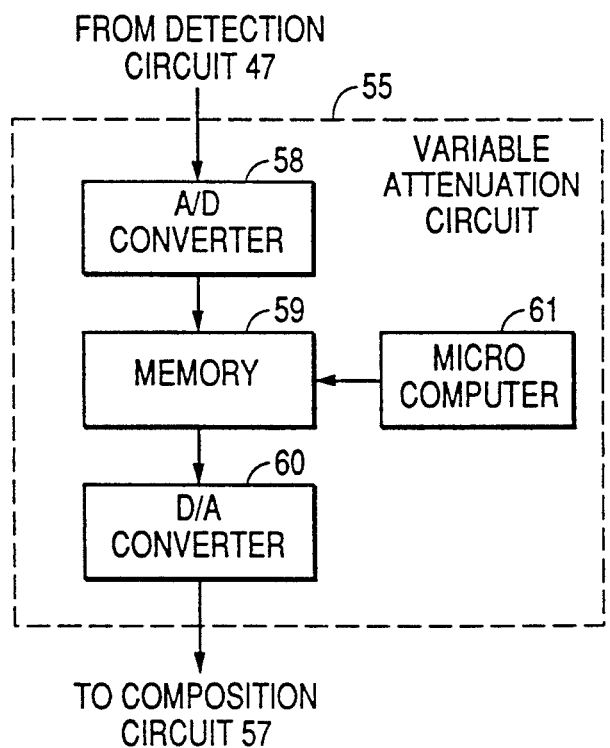
FIG. 21 is a block diagram showing a modified example of the variable attenuation circuit as an element composing the correction circuit in the case of amplitude or phase modulation of a subcarrier in this invention.

FIG. 21 is a block diagram showing a modified version of the variable attenuation circuit 55 in the case of the picture subcarrier modulation circuit 6 being an amplitude or phase modulation circuit in the transmission apparatus of this invention. The variable attenuation circuit 55 in FIG. 21 is composed in the same manner regardless of whether the crosstalk reduction circuit is located on the transmitting or the receiving side. This composition is entirely identical to that in FIG. 18 except that no differentiation circuit is used and the output of the variable attenuation circuit 55 directly goes to the composition circuit 57.

Figure 22:
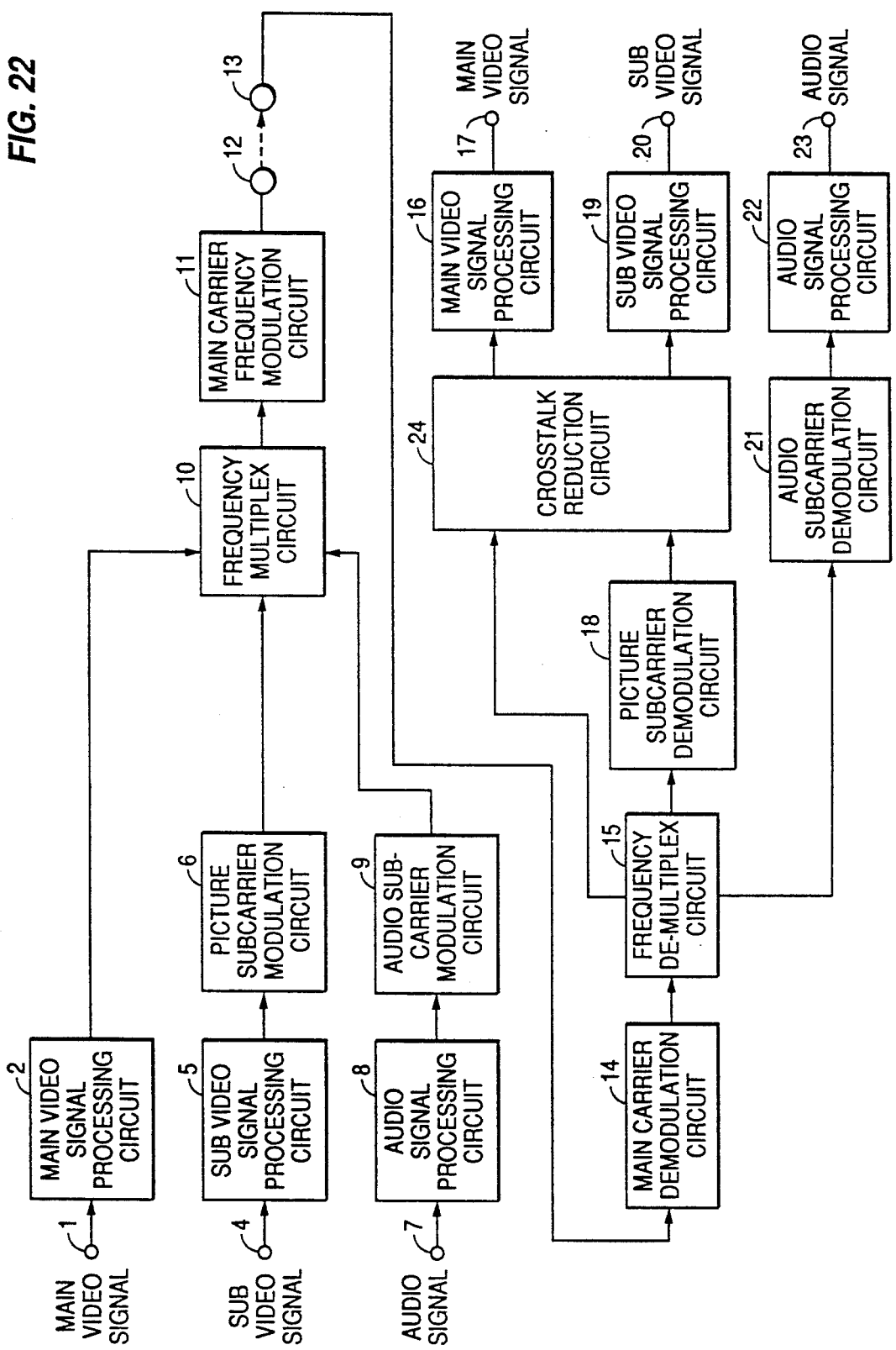
FIG. 22 is a block diagram of a transmission apparatus with a crosstalk reduction circuit attached to the receiving side showing the process from the generation to the reproduction of a satellite broadcasting signal in the second embodiment of this invention.

FIG. 22 shows the second embodiment of this invention where the crosstalk elimination circuit is added to the receiving side. In FIG. 22, the main video signal enters the main video signal processing circuit 2 at the terminal 1 to receive the processings of band limitation and preemphasis. The main video signal thus converted into a video signal suitable for satellite transmission is outputted to the frequency multiplex circuit 10. On the other hand, the sub video signal enters the sub video signal processing circuit 5 at the terminal 4 to receive the pre-emphasis processing if the picture subcarrier modulation circuit 6 is a frequency modulation circuit. In the case where the picture subcarrier modulation circuit 6 is an amplitude or phase modulation circuit, the sub video signal receive no the such processings and the sub video signal processing circuit 5 is omitted. In the picture subcarrier modulation circuit 6, a picture subcarrier with a frequency arranged higher than those of the main video signal and audio subcarrier is generated to undergo amplitude, frequency, or phase modulation. Then, the signal is outputted to the frequency multiplex circuit 10. Meanwhile, the audio signal enters the audio signal processing circuit 8 at the terminal 7 to be converted from an analog to a PCM digital audio signal. In the audio subcarrier modulation circuit 9, a generated audio subcarrier with a frequency of 5.727272 MHz undergoes QPSK modulation to be outputted to the frequency multiplex circuit 10. In the frequency multiplex circuit 10, the main video signal, the modulated sub video signal, and the modulated audio signal are subjected to frequency multiplexing along the baseband frequency axis as shown in FIG. 2. In the main carrier frequency modulation circuit 11, a main carrier is generated to undergo frequency modulation by the multiplex signal produced in the frequency multiplex circuit 10. The signal is then outputted from the terminal 12 to a broadcasting satellite. The signal received from the broadcasting satellite enters the terminal 13 to be inputted to the main carrier demodulation circuit 14. In the main carrier demodulation circuit 14, the signal that has undergone the frequency multiplexing as shown in FIG. 2 is reproduced and then outputted to the frequency demultiplex circuit 15 to be divided into the main video signal, the modulated sub video signal, and the modulated audio signal. The main video signal component is inputted to the crosstalk reduction circuit 24. The modulated sub video signal component is demodulated, in the picture subcarrier demodulation circuit 18, by a the demodulation method used corresponding to the modulation method in the picture subcarrier modulation circuit 6. The demodulated signal is outputted to the crosstalk reduction circuit 24. In the crosstalk reduction circuit 24, the main video signal component input from the frequency de-multiplex circuit 15 is first delayed by the amount of delay in the picture subcarrier demodulation circuit 18. Then, a crosstalk correction signal equal in magnitude but negative in phase to the crosstalk from the main video signal to the sub video signal is prepared on the basis of the delayed signal. The crosstalk correction signal is added to the sub video signal inputted from the picture subcarrier demodulation circuit 18 and outputted to the sub video signal processing circuit 19. At the same time, the delayed main video signal is outputted directly to the main video signal processing circuit 16 and receives the processing of de-emphasis to be outputted to the terminal 17 as a demodulated main video signal. The signal inputted to the sub video signal processing circuit 19 receives the de-emphasis processing and band limitation processing to be outputted to the terminal 20 as a demodulated sub video signal if the signal has undergone frequency modulation in the picture subcarrier modulation circuit 6. However, the signal which has undergone amplitude or phase modulation in the picture subcarrier modulation circuit 6 receives only band limitation processing in the sub video signal processing circuit 19 and is outputted to the terminal 20 as a demodulated sub video signal. On the other hand, the modulated audio signal component is subjected to QPSK demodulation in the audio subcarrier demodulation circuit 21 and a PCM digital signal is reproduced. In the audio signal processing circuit 22, the PCM digital audio signal is decoded and converted into an analog signal to be outputted to the terminal 23 as a demodulated audio signal. As shown above, in this embodiment, the main-to-sub signal crosstalk generated on the transmission line of the main carrier is improved by the crosstalk reduction circuit established on the receiving side. In other words, the crosstalk is offset with the crosstalk correction signal that has been added to the demodulated sub signal. Moreover, the characteristics of the crosstalk reduction circuit can be changed so as to meet the characteristics of the BPF inside the receiver constituting a part of the main carrier transmission line, implementing a higher improvement effect on the crosstalk than in a case where the crosstalk reduction circuit is established on the transmitting side.

The explanation below of each block with functions possessed by that in the first embodiment in common is briefed and, for the blocks entirely identical to those in the first embodiment, an explanation is omitted.

Figure 23:
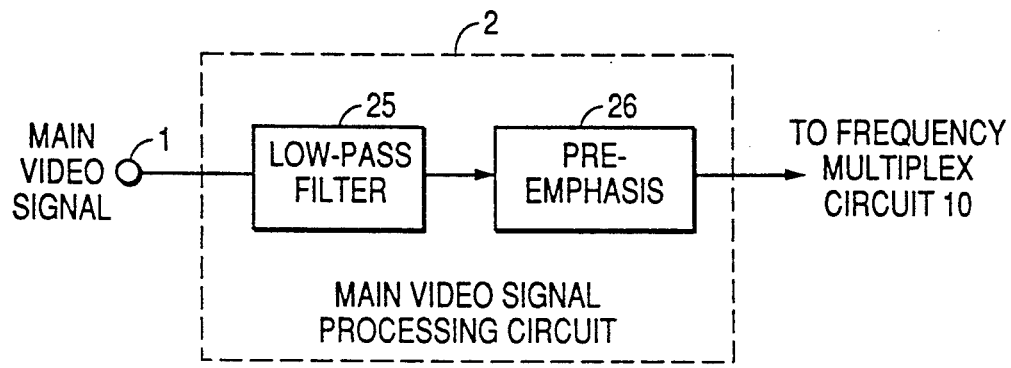
FIG. 23 is a block diagram showing an example of the main signal processing circuit on the transmitting side in the second embodiment of this invention.

FIG. 23 is a block diagram of the main video signal processing circuit 2 on the transmitting side, and is different from FIG. 3 only in that the output is connected to the next stage of the frequency multiplex circuit 10.

Figure 24:
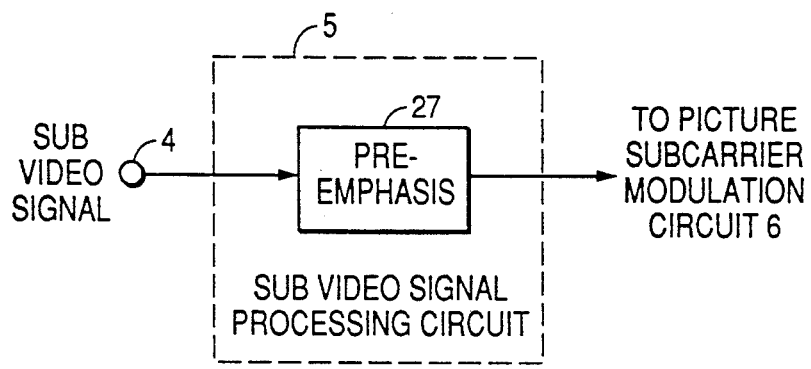
FIG. 24 is a block diagram showing an example of the sub signal processing circuit on the transmitting side in the second embodiment of this invention.

FIG. 24 is a block diagram of the sub video signal processing circuit 5 on the transmitting side, and is different from FIG. 4 only in that the output is connected to the next stage of the picture subcarrier modulation circuit 6.

Figure 25:
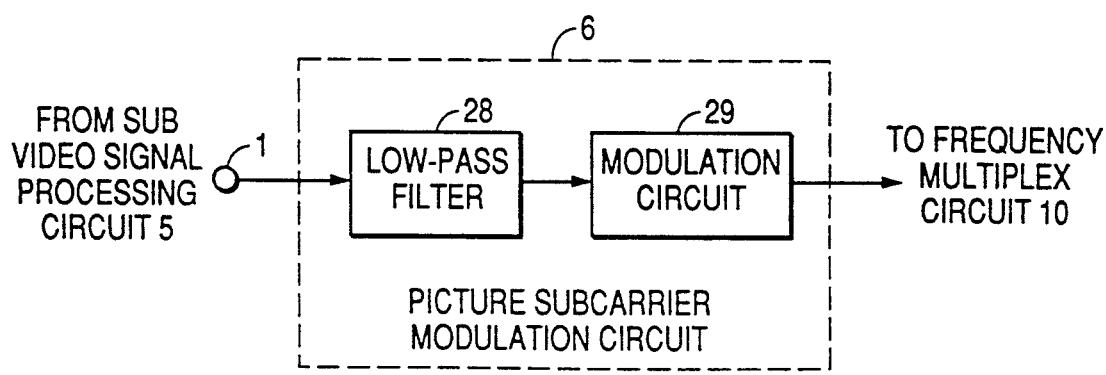
FIG. 25 is a block diagram showing an example of the picture subcarrier modulation circuit in the second embodiment of this invention.

FIG. 25 is a block diagram of the picture subcarrier modulation circuit 6, and is different from FIG. 5 only in that the signal is inputted from the preceding stage of the sub video signal processing circuit 5.

Figure 26:
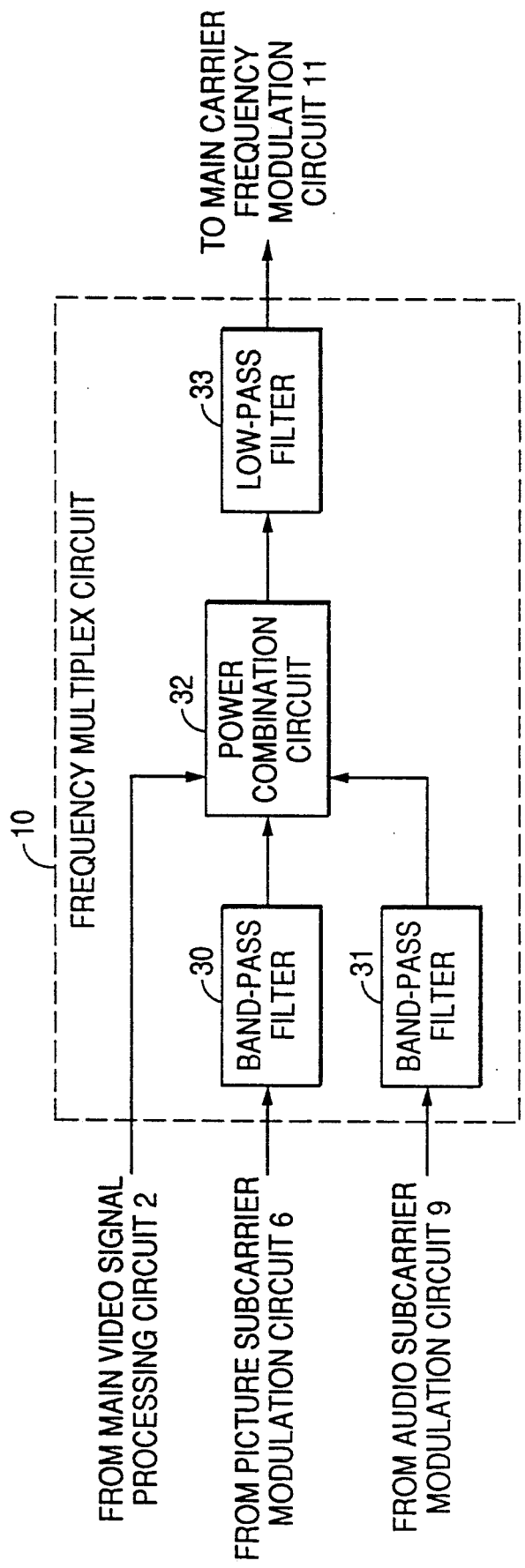
FIG. 26 is a block diagram showing an example of the frequency multiplex circuit in the second embodiment of this invention.

FIG. 26 is a block diagram of the frequency multiplex circuit 10, and is different from FIG. 7 only in that the signal is inputted from the preceding stage of the main video signal processing circuit 2.

Figure 27:
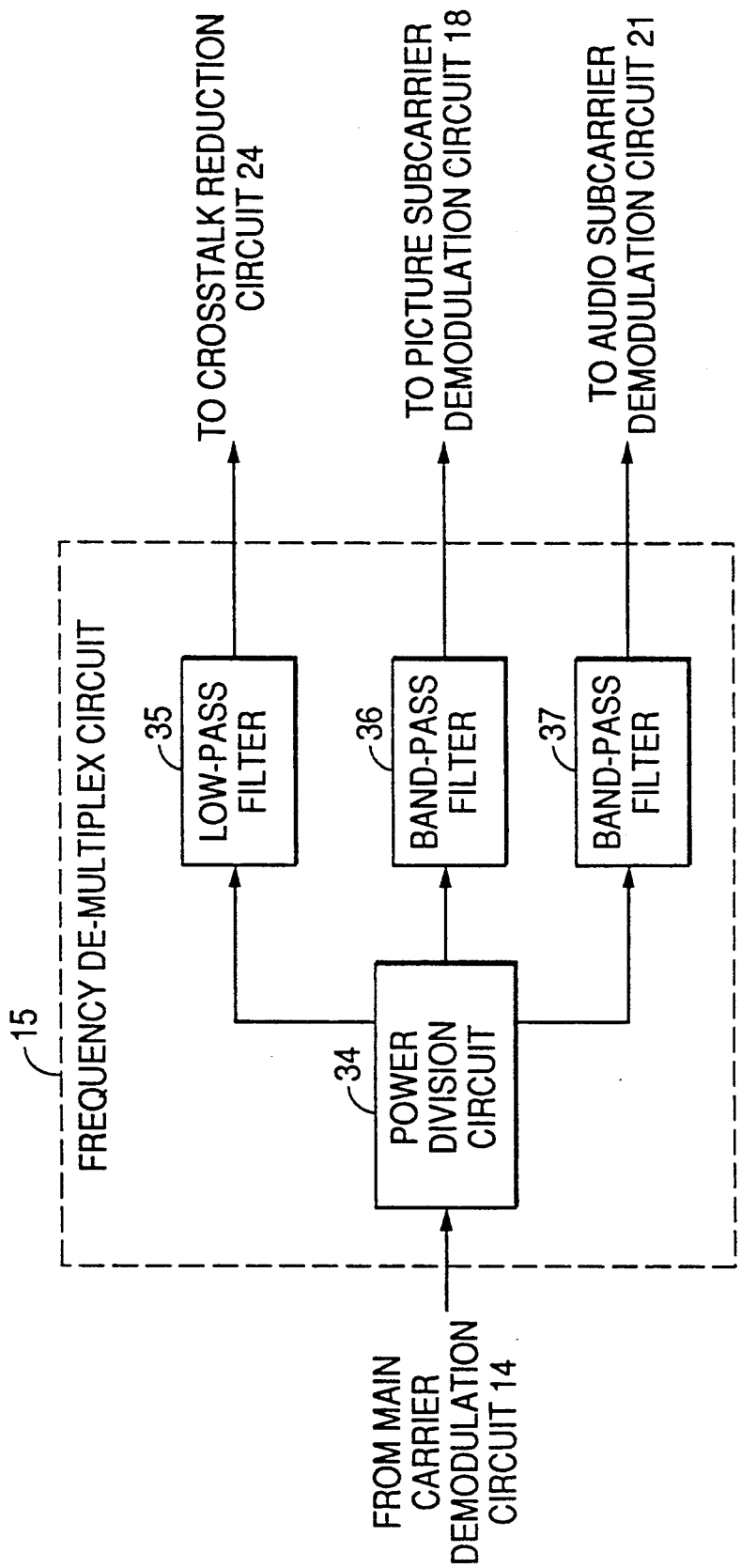
FIG. 27 is a block diagram showing an embodiment of the frequency de-multiplex circuit in the second embodiment of this invention.

FIG. 27 is a block diagram of the frequency demultiplex circuit 15, and is different from FIG. 8 only in that the output of the low-pass filter 35 is connected to the next stage of the crosstalk reduction circuit 24.

Figure 28:
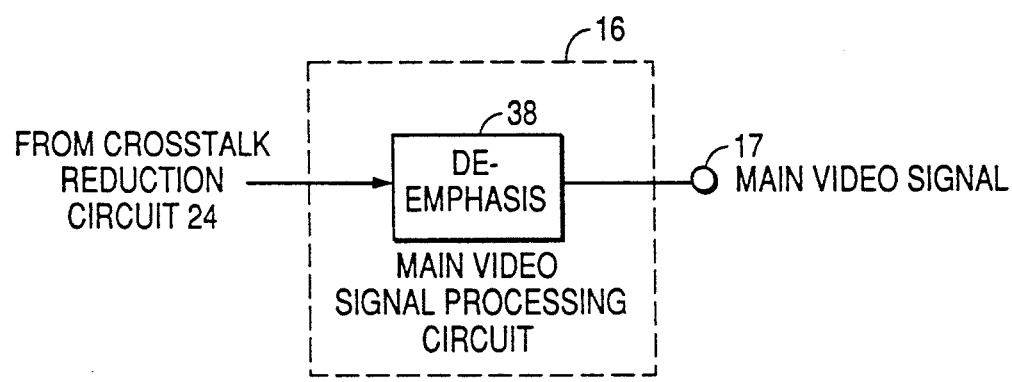
FIG. 28 is a block diagram showing an example of the main video signal processing circuit on the receiving side in the second embodiment of this invention.

FIG. 28 is a block diagram of the main video signal processing circuit 16 on the receiving side, and is different form FIG. 9 only in that the signal is inputted from the preceding stage of the crosstalk reduction circuit 24.

Figure 29:
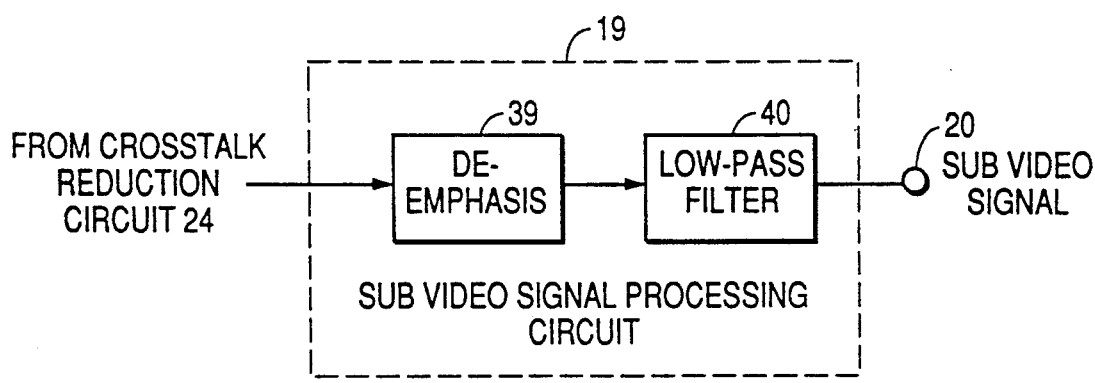
FIG. 29 is a block diagram showing an embodiment of the sub video signal processing circuit on the receiving side in the second embodiment of this invention.

FIG. 29 is a block diagram of the sub video signal processing circuit 19 on the receiving side, and is different from FIG. 10 only in that the signal is inputted from the preceding stage of the crosstalk reduction circuit 24.

Figure 30:
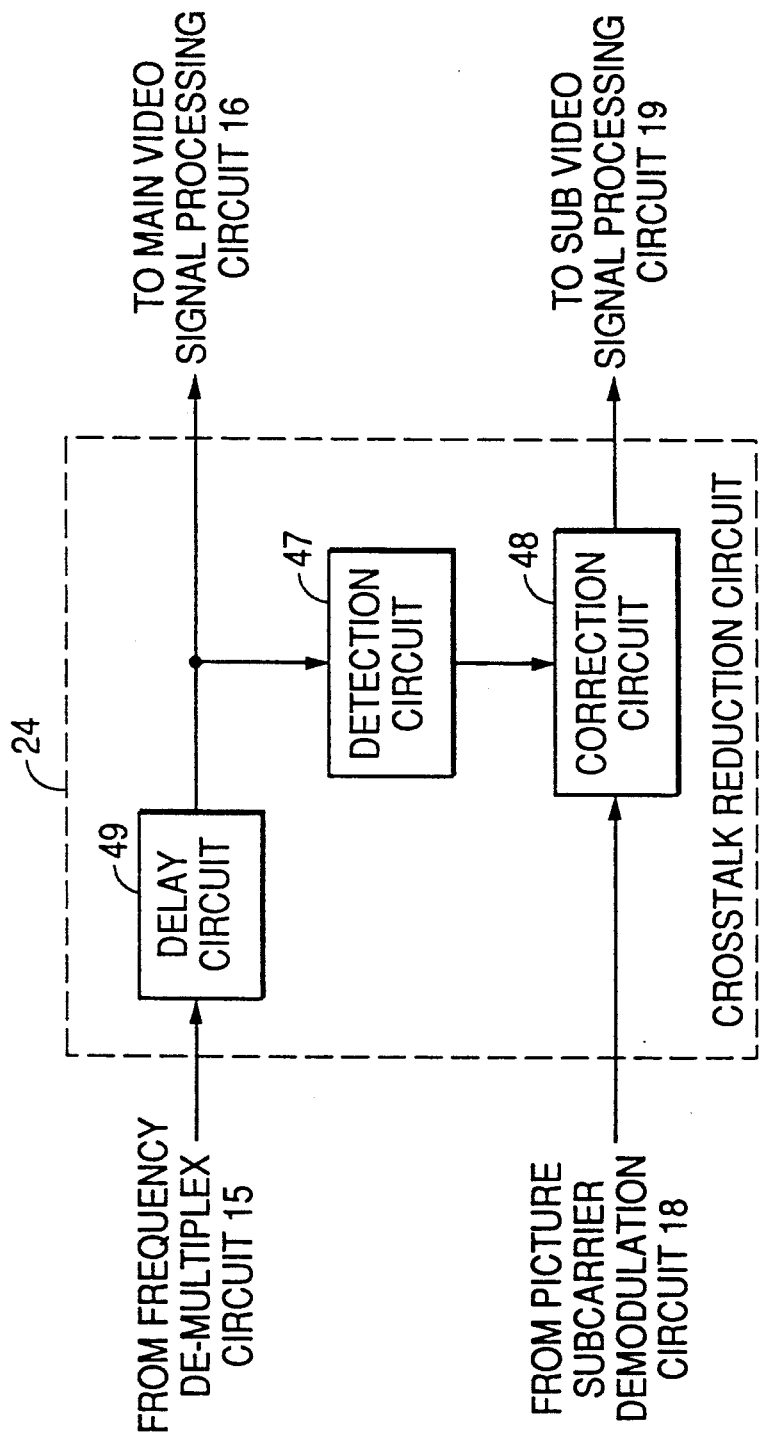
FIG. 30 is a block diagram showing an example of the crosstalk reduction circuit in the second embodiment of this invention.

FIG. 30 is a block diagram of the crosstalk reduction circuit 24 in the second embodiment of the transmission apparatus of this invention. The main video signal component separated in the preceding stage of the frequency demultiplex circuit 15 is inputted to the delay circuit 49. In the delay circuit 49, a delay takes place in the same amount as in the picture subcarrier demodulation circuit 18. In the same circuit, the main video signal receives an adjustment of the time difference from the sub video signal side to be outputted to the following stages of the detection circuit 47 and main video signal processing circuit 16. Unless this delayed time is adjusted, a time difference is generated between the prepared and added crosstalk correction signal and the actual crosstalk to be created, hampering the reduction of crosstalk. It is also necessary to consider the total delayed time $\tau 2$ in the detection circuit 47 and the correction circuit 48 if not negligible. In this case, the delayed time $\tau 1$ in the delay circuit 49 is given by the equation of $\tau 1 = \tau 0 - \tau 2$ with the delayed time in the picture subcarrier demodulation circuit 18 taken as $\tau 0$. The detection circuit 47, functioning as in the first embodiment, detects the difference between the instantaneous voltage of the main video signal that has been subjected to pre-emphasis and the voltage of the main video signal which corresponds to the central frequency on the transmission line after frequency modulation of the main carrier. In the correction circuit 48, the main video signal is attenuated in accordance with the output of the detection circuit 47 to prepare a crosstalk correction signal. For reference, the output of the detection circuit 47 is used as the main video signal to be inputted to the correction circuit 48 since such an output is a main video signal that has undergone a change only on the DC level. The resulting crosstalk correction signal is added to the output from the preceding picture subcarrier demodulation circuit 18 to be outputted to the next stage of the sub video signal processing circuit 19.

Figure 31:
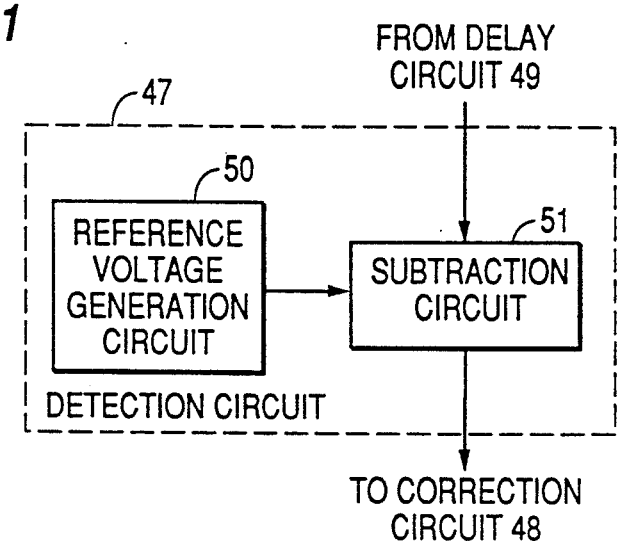
FIG. 31 is a block diagram showing an example of the detection circuit as an element composing the crosstalk reduction circuit in the second embodiment of this invention.

FIG. 31 is a block diagram of the detection circuit 47 in the second embodiment of the transmission apparatus of this invention, and is different from FIG. 13 only in that the signal is inputted from the preceding stage of the delay circuit 49.

Figure 32:
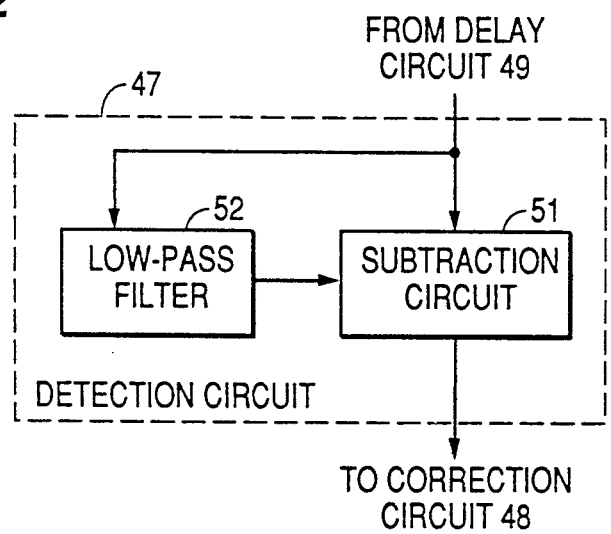
FIG. 32 is a block diagram showing an example of the detection circuit as an element composing the crosstalk reduction circuit in the case of transmission of a main carrier by the averaging AFC method in the second embodiment of this invention.

FIG. 32 is a block diagram of the detection circuit 47 in the case of transmission of a main carrier by the averaging AFC method in the second embodiment of the transmission apparatus of this invention, and is different from FIG. 14 only in that the signal is inputted from the preceding stage of the delay circuit 49.

Figure 33:
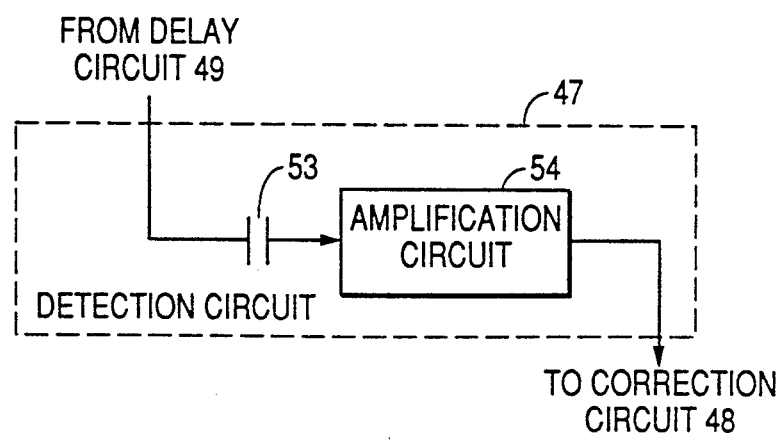
FIG. 33 is a block diagram showing a modified example of the detection circuit as an element composing the crosstalk reduction circuit in the case of transmission of a main carrier by the averaging AFC method in the second embodiment of this invention.

FIG. 33 is a block diagram showing a modified version of the detection circuit 47 in the case of transmission of a main carrier by the averaging AFC method in the second embodiment of the transmission apparatus of this invention, and is different from FIG. 15 only in that the signal is inputted from the preceding stage of the delay circuit 49.

Figure 34:
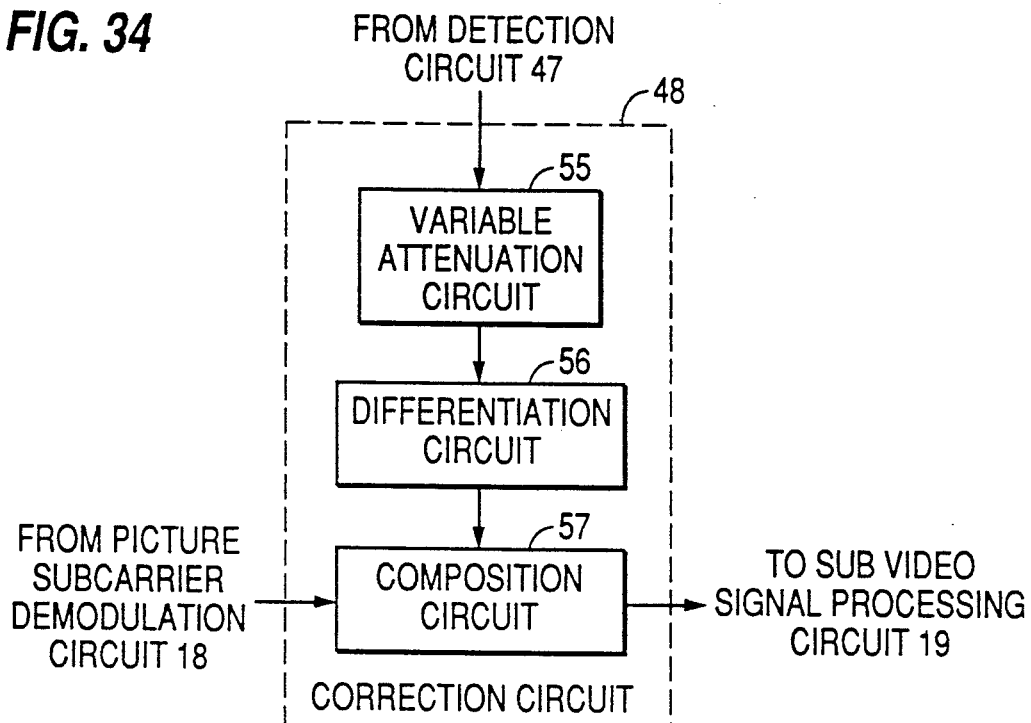
FIG. 34 is a block diagram showing an example of the correction circuit as an element composing the crosstalk reduction circuit in the case of frequency modulation of a subcarrier in the second embodiment of this invention.

FIG. 34 is a block diagram of the correction circuit 48 in the case of the picture subcarrier modulation circuit 6 being a frequency modulation circuit, and is different from FIG. 16 only in that the crosstalk correction signal is added to the output from the preceding stage of the picture subcarrier demodulation circuit 18 in the composition circuit 57 to be outputted to the next stage of sub video signal processing circuit 19.

Figure 35:
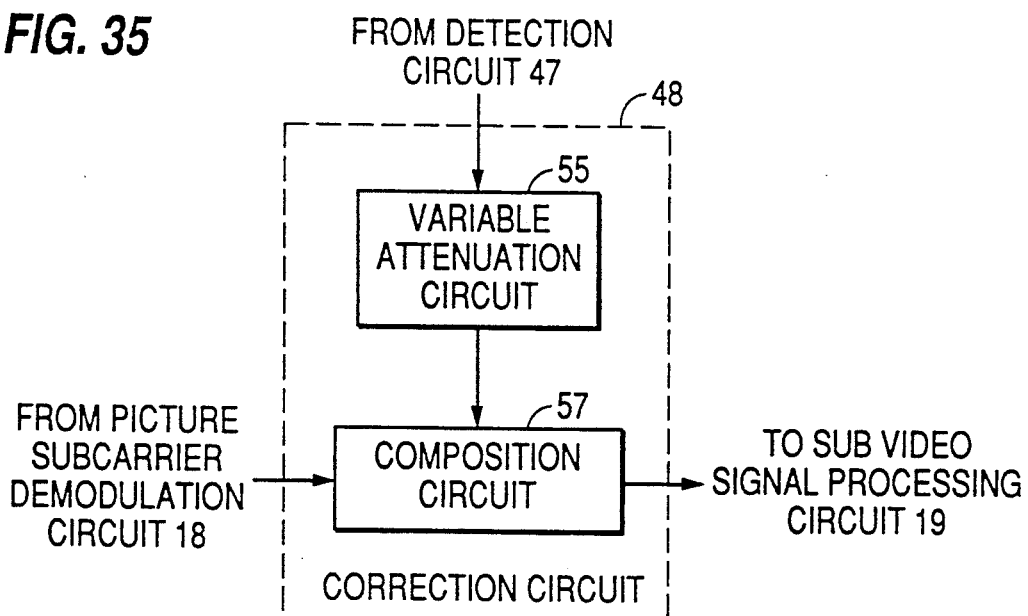
FIG. 35 is a block diagram showing an example of the correction circuit as an element composing the crosstalk reduction circuit in the case of amplitude or phase modulation of a subcarrier in the second embodiment of this invention.

FIG. 35 is a block diagram of the correction circuit 48 in the case of the picture subcarrier modulation circuit 6 being an amplitude or phase modulation circuit, and is different from FIG. 19 only in that the crosstalk correction signal is added to the output from the preceding stage of the picture subcarrier demodulation circuit 18 in the composition circuit 57 to be outputted to the next stage of the sub video signal processing circuit 19.

What is claimed is:

1. A transmission apparatus for transmitting a main signal and a sub signal through a transmission line, comprising:
    a crosstalk reduction circuit for producing from the main signal a crosstalk correction signal equal in magnitude to and opposite in phase to a crosstalk from the main signal to the sub signal and for adding the crosstalk correction signal to the sub signal;
    a first modulation circuit for modulating a subcarrier having a frequency higher than a band of the main signal by an output signal of the crosstalk reduction circuit to obtain a modulated subcarrier;
    a frequency multiplex circuit for frequency-multiplexing the main signal and the modulated subcarrier to obtain a frequency-multiplexed signal; and
    a second modulation circuit for frequency modulating a main carrier by the frequency-multiplexed signal to obtain a frequency modulated signal, the frequency modulated signal being transmitted through the transmission line.

2. A transmission apparatus according to claim 1, wherein the first modulation circuit subjects the subcarrier to frequency modulation by the output signal of the crosstalk reduction circuit to obtain a frequencymodulated subcarrier.

3. A transmission apparatus according to claim 1, wherein the first modulation circuit subjects the subcarrier to amplitude modulation by the output signal of the crosstalk reduction circuit to obtain an amplitudemodulated subcarrier.

4. A transmission apparatus according to claim 1, wherein the first modulation circuit subjects the subcarrier to amplitude modulation by the output signal of the crosstalk reduction circuit to obtain a phase-modulated subcarrier.

5. A transmission apparatus for transmitting a main signal and a sub signal through a transmission line, comprising:
    a crosstalk reduction circuit for producing from the main signal a crosstalk correction signal equal in magnitude to and opposite in phase to a crosstalk form the main signal to the sub signal and for adding the crosstalk correction signal to the sub signal;
    a first modulation circuit for modulating a subcarrier having a frequency higher than a band of the main signal by an output signal of the crosstalk reduction circuit to obtain a modulated subcarrier;
    a frequency multiplex circuit for frequency-multiplexing the main signal and the modulated subcarrier to obtain a frequency-multiplexed signal; and
    a second modulating circuit for frequency modulating a main carrier by the frequency-multiplexed signal to obtain a frequency modulated signal, the frequency modulated signal being transmitted through the transmission line,
    wherein the crosstalk reduction circuit comprises:
    a detection circuit for detecting form the main signal a deviation of a frequency of the main carrier form a central frequency on the transmission line to obtain a frequency deviation detection signal;
    a correction circuit for producing the crosstalk correction signal form the frequency deviation detection signal and for adding the crosstalk correction signal to the sub signal; and
    a delay circuit for delaying the main signal by an amount of time equal to a sum of delayed times in the detection circuit, the correction circuit and the first modulation circuit to obtain a delayed main signal, the delayed main signal being fed to the frequency multiplex circuit.

6. A transmission apparatus according to claim 5, wherein the detection circuit comprises a reference voltage generation circuit for generating a voltage of the main signal corresponding to the central frequency on the transmission line at the time of frequency modulation of the main carrier, and a subtraction circuit for obtaining a difference between an output voltage of the reference voltage generation circuit and the main signal.

7. A transmission apparatus according to claim 5, wherein the detection circuit comprises a lowpass filter for passing only a direct current of the main signal, and a subtraction circuit for obtaining a difference between an output of the lowpass filter and the main signal.

8. A transmission apparatus according to claim 5, wherein the detection circuit comprises a capacitance coupling amplifier for amplifying the main signal.

9. A transmission apparatus according to claim 5, wherein the correction circuit comprises a variable attenuation circuit for attenuating the main signal in accordance with frequency deviation detection signal, a differentiations circuit for differentiating an output of the variable attenuation circuit by time, and a composition circuit for composing an output of the differentiation circuit and the sub signal, and wherein the first modulation circuit subjects the subcarrier to frequency modulation by the output signal of the crosstalk reduction circuit to obtain a frequency-modulated subcarrier.

10. A transmission apparatus according to claim 9, wherein the detection circuit outputs the frequency deviation detection signal in a digital signal form, and wherein the variable attenuation circuit comprises a memory receiving the digital output from the detection circuit as an address for outputting data designated by the address.

11. A transmission apparatus according to claim 5, wherein the correction circuit comprises a variable attenuation circuit for attenuation the main signal in accordance with the frequency deviation detection signal, and a composition circuit for composing an output of the variable attenuation circuit and the sub signal, and wherein the first modulation circuit subjects the subcarrier to amplitude modulation by the output signal of the crosstalk reduction circuit to obtain an amplitude-modulated subcarrier.

12. A transmission apparatus according to claim 11, wherein the detection circuit outputs the frequency deviation detection signal in a digital signal form, and wherein the variable attenuation circuit comprises a memory receiving the digital output from the detection circuit as an address for outputting data designated by the address.

13. A transmission apparatus according to claim 5, wherein the correction circuit comprises a variable attenuation circuit for attenuating the main signal in accordance with the frequency deviation detection signal, and a composition circuit for composing an output of the variable attenuation circuit and the sub signal, and wherein the first modulation circuit subjects the subcarrier to phase modulation by the output signal of the crosstalk reduction circuit to obtain a phase-modulated subcarrier.

14. A transmission apparatus according to claim 13, wherein the detection circuit outputs the frequency deviation detection signal in a digital signal form, and wherein the variable attenuation circuit comprises a memory receiving the digital output frog the detection circuit as an address for outputting data designated by the address.

15. A transmission apparatus for receiving a transmitted signal through a transmission line, the transmitted signal being a frequency modulated signal having been made by frequency modulating main carrier by a frequency-multiplexed signal in which a main signal and a modulated subcarrier obtained by modulating a subcarrier having a higher frequency than a frequency band of the main signal by a sub signal were frequency-multiplexed, said apparatus comprising:
a first demodulation circuit for demodulating the frequency modulated signal to obtain the frequency-multiplexed signal;
a frequency de-multiplex circuit for frequency-demultiplexing the frequency-multiplexed signal from the first demodulation circuit into the main signal and the modulated subcarrier;
a second demodulating circuit for demodulating the modulated subcarrier from the frequency de-multiplex circuit to obtain the sub signal; and
a crosstalk reduction circuit for producing from the main signal form the frequency de-multiplex circuit a crosstalk correction signal equal in magnitude to and opposite in phase to a crosstalk from the main signal to the sub signal and for adding the crosstalk correction signal to the sub signal from the second demodulation circuit.

16. A transmission apparatus according to claim 15, wherein the modulated subcarrier is a frequency modulated subcarrier obtained by frequency-modulating the subcarrier by the sub signal, and wherein the second demodulation circuit subjects the modulated subcarrier to frequency demodulation to obtain the sub signal.

17. A transmission apparatus according to claim 15, wherein the modulated subcarrier is an amplitude modulated subcarrier obtained by amplitude-modulating the subcarrier by the sub signal, and wherein the second demodulation circuit subjects the modulated subcarrier to amplitude demodulation to obtain the sub signal.

18. A transmission apparatus according to claim 15, wherein the modulated subcarrier is a phase modulated subcarrier obtained by phase-modulating the subcarrier by the sub signal, and wherein the second demodulation circuit subjects the modulated subcarrier to phase demodulation to obtain the sub signal.

19. A transmission apparatus for receiving a transmitted signal through a transmission line, the transmitted signal being a frequency modulated signal having been made by frequency modulating a main carrier by a frequency-multiplexed signal in which a main signal and a modulated subcarrier obtained by modulating a subcarrier having a higher frequency than a frequency band of the main signal by a sub signal were frequency-multiplexed, said apparatus comprising:
a first demodulation circuit for demodulating the frequency modulated signal to obtain the frequency-multiplexed signal;
a frequency de-multiplex circuit for frequency-demultiplexing the frequency-multiplexed signal from the first demodulation circuit into the main signal and the modulated subcarrier;
a second demodulating circuit for demodulating the modulated subcarrier from the frequency de-multiplex circuit to obtain the sub signal and
a crosstalk reduction circuit for producing from the main signal from the frequency de-multiplex circuit a crosstalk correction signal equal in magnitude to and opposite in phase to a crosstalk from the main signal to the sub signal and for adding the crosstalk correction signal to the sub signal from the second demodulation circuit.
wherein the crosstalk reduction circuit comprises:
a detection circuit for detecting from the main signal a frequency deviation of the main carrier form a central frequency on the transmission line to obtain a frequency deviation detection signal;
a correction circuit for producing from the frequency deviation detection signal a crosstalk correction signal and adding the crosstalk correction signal to the sub signal; and
a delay circuit for delaying the main signal by an amount of time equal to a difference between a delayed time in the second demodulation circuit and a sum of delayed times in the detection circuit and the correction circuit to obtain a delayed main signal, the delayed main signal being fed to the detection circuit.

20. A transmission apparatus according to claim 19, wherein the detection circuit comprises a reference voltage generation circuit for generating a voltage of the main signal corresponding to the central frequency on the transmission line at the time of frequency modulation of the main carrier, and a subtraction circuit for obtaining a difference between an output of the reference voltage generation circuit and the main signal.

21. A transmission apparatus according to claim 19, wherein the detection circuit comprises a low-pass filter for passing only a direct current of the main signal, and a subtraction circuit for obtaining a difference between an output of the low-pass filter and the main signal.

22. A transmission apparatus according to claim 19, wherein the detection circuit comprises a capacitance coupling amplifier for amplifying the main signal.

23. A transmission apparatus according to claim 19, wherein the modulated subcarrier is a frequency modulated subcarrier obtained by frequencymodulating the subcarrier by the sub signal, wherein the correction circuit comprises a variable attenuation cirucit for attenuating the main signal in accordance with the frequency deviation detection signal, a differentiation circuit for differentiating an output of the variable attenuation circuit by time, and a composition circuit for composing an output of the differentiation circuit and the sub signal, and wherein the second demodulation circuit subjects the modulated subcarrier to frequency demodulation.

24. A transmission apparatus according to claim 23, wherein the detection circuit outputs the frequency deviation detection signal is a digital signal form, and wherein the variable attenuation circuit comprises a memory receiving the digital output from the detection circuit as an address for outputting data designated by the address.

25. A transmission apparatus according to claim 19, wherein the modulated subcarrier is an amplitude modulated subcarrier obtained by amplitude-modulating the subcarrier by the sub signal, wherein the correction circuit comprises a variable attenuation circuit for attenuating the main signal in accordance with frequency deviation detection signal, and a composition circuit for composing an output of the variable attenuation circuit and the sub signal, and wherein the second demodulation circuit subjects the modulated subcarrier to amplitude demodulation.

26. A transmission apparatus according to claim 25, wherein the detection circuit outputs the frequency deviation detection signal in a digital signal form, and wherein the variable attenuation circuit comprises a memory receiving the digital output from the detection circuit as an address for outputting data designated by the address.

27. A transmission apparatus according to claim 19, wherein the modulated subcarrier is a phase modulated subcarrier obtained by phase-modulating the subcarrier by the sub signal, wherein the correction circuit comprises a variable attenuation circuit for attenuating the main signal in accordance with frequency deviation detection signal, and a composition circuit for composing an output of the variable attenuation circuit and the sub signal, and wherein the second demodulation circuit subjects the modulated subcarrier to phase demodulation.

28. A transmission apparatus according to claim 27, wherein the detection circuit outputs the frequency deviation detection signal in a digital signal form, and wherein the variable attenuation circuit comprises a memory receiving the digital output from the detection circuit as an address for outputting data designated by the address.

* * * * *